US012387433B2

(12) United States Patent
Hellge et al.

(10) Patent No.: US 12,387,433 B2
(45) Date of Patent: Aug. 12, 2025

(54) DATA STREAM, DEVICES AND METHODS FOR VOLUMETRIC VIDEO DATA

(71) Applicant: Fraunhofer-Gesellschaft zur Foerderung der angewandten Forschung e.V., Munich (DE)

(72) Inventors: Cornelius Hellge, Berlin (DE); Thomas Schierl, Berlin (DE); Peter Eisert, Berlin (DE); Anna Hilsmann, Berlin (DE); Robert Skupin, Berlin (DE); Yago Sánchez De La Fuente, Berlin (DE); Wieland Morgenstern, Berlin (DE); Gurdeep Singh Bhullar, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 155 days.

(21) Appl. No.: 18/193,394

(22) Filed: Mar. 30, 2023

(65) Prior Publication Data

US 2023/0260215 A1    Aug. 17, 2023

Related U.S. Application Data

(63) Continuation of application No. PCT/EP2021/076917, filed on Sep. 30, 2021.

(30) Foreign Application Priority Data

Oct. 2, 2020  (EP) .................................. 20199853

(51) Int. Cl.
*G06T 17/20*    (2006.01)
*G06T 7/70*    (2017.01)
(Continued)

(52) U.S. Cl.
CPC .............. *G06T 17/205* (2013.01); *G06T 7/70* (2017.01); *G06T 13/40* (2013.01); *H04N 13/388* (2018.05); *G06T 2207/20044* (2013.01)

(58) Field of Classification Search
CPC ......... G06T 17/205; G06T 7/70; G06T 13/40; G06T 2200/16; G06T 2219/2016;
(Continued)

(56) References Cited

U.S. PATENT DOCUMENTS 6,148,026 A * 11/2000 Puri ...................... H04N 19/29
                                                       375/240
2002/0159518 A1 * 10/2002 Bottreau ............... H04N 19/36
                                                       375/240.1
(Continued)

FOREIGN PATENT DOCUMENTS

EP    2260403 B1    3/2017

OTHER PUBLICATIONS

GüL, Serhan, et al., "Low Latency Volumetric Video Edge Cloud Streaming", NOSSDAV '20: Proceedings of the 30th ACM Workshop on Network and Operating Systems Support for Digital Audio and Video, Jun. 2020.
(Continued)

*Primary Examiner* — Jeffery A Brier
(74) *Attorney, Agent, or Firm* — PERKINS COIE LLP; Michael A. Glenn

(57) ABSTRACT

A data stream having volumetric video data encoded therein in a scene description language, the data stream representing a scene comprising one or more objects is disclosed, wherein the data stream comprises for at least one object first mesh data, second mesh data and correspondence information, wherein the first mesh data describes the at least one object with a first mesh, the second mesh data describes the at least one object with a second mesh, and wherein the correspon-
(Continued)

dence information indicates a mapping between the first and second mesh. Devices, Methods and a computer program product are also described.

32 Claims, 28 Drawing Sheets

(51) Int. Cl.
*G06T 13/40* (2011.01)
*H04N 13/388* (2018.01)

(58) Field of Classification Search
CPC ........... G06T 17/20; G06T 2207/20044; G06T 19/20; H04N 13/388; H04N 21/44012; H04N 21/816
See application file for complete search history.

(56) References Cited

U.S. PATENT DOCUMENTS

| | | | |
|---|---|---|---|
| 2019/0236809 A1* | 8/2019 | Graziosi | ................. G06T 7/10 |
| 2019/0392626 A1 | 12/2019 | Black et al. | |
| 2020/0035021 A1 | 1/2020 | Horsman et al. | |

OTHER PUBLICATIONS

Kim, Meekyoung, et al., "Data-driven physics for human soft tissue animation", ACM Transactions on Graphics, vol. 36, No. 4, Jul. 20, 2017, pp. 1-12, XP058372828.

* cited by examiner

```
{
  "scenes" : [ {
    "nodes" : [ 0 ]
  } ],

"nodes" : [ {
    "skin" : 0,
    "mesh" : 0,
    "children" : [ 1 ]
  }, {
    "children" : [ 2 ],
    "translation" : [ 0.0, 1.0, 0.0 ]
  }, {
    "rotation" : [ 0.0, 0.0, 0.0, 1.0 ]
  } ], "meshes"
: [ {
    "primitives" : [ {
      "attributes" : {
        "POSITION" : 1,
        "JOINTS_0" : 2,
        "WEIGHTS_0" : 3
      },
      "indices" : 0
    } ]
  } ], "skins" : [ {
    "inverseBindMatrices" : 4,
    "joints" : [ 1, 2 ]
  } ], "animations" : [ {
    "channels" : [ {
      "sampler" : 0,
      "target" : {
        "node" : 2,
        "path" : "rotation"
      }
    } ],
    "samplers" : [ {
      "input" : 5,
      "interpolation" : "LINEAR",
      "output" : 6
    } ]
  } ], "buffers" : ..., "bufferViews" : ...
  ], "accessors" : ...,
  }
}
```

Fig. 3

```
attribute vec4 a_joint;
attribute vec4 a_weight;

uniform mat4 u_jointMat[2];

...
void main(void)
{
   mat4 skinMat =
      a_weight.x * u_jointMat[int(a_joint.x)] +
      a_weight.y * u_jointMat[int(a_joint.y)] +
      a_weight.z * u_jointMat[int(a_joint.z)] +
      a_weight.w * u_jointMat[int(a_joint.w)];
   vec4 pos = u_modelViewMatrix * skinMat * vec4(a_position,1.0);
   gl_Position = u_projectionMatrix * pos;
}
```

Fig. 4

```
{
  "scenes":[
    {
      "nodes":[
        0
      ]
    }
  ],
  "nodes":[
    {
      "mesh":0
    }
  ],
  "meshes":[
    {
      "primitives":[
        {
          "attributes":{
            "POSITION":1
          },
          "targets":[
            {
              "POSITION":2
            },
            {
              "POSITION":3
            }
          ],
          "indices":0
        }
      ],
      "weights":[
        1.0,
        0.5
      ]
```

```
      ]
    }
  ],
  "animations":[
    {
      "samplers":[
        {
          "input":4,
          "interpolation":"LINEAR",
          "output":5
        }
      ],
      "channels":[
        {
          "sampler":0,
          "target":{
            "node":0,
            "path":"weights"
          }
        }
      ]
    }
  ],
  "buffers" : ...,
  "bufferViews" : ...,
  "accessors" : ...,
}
```

Fig. 5 renderedPrimitive.POSITTION = primitive.POSITTION +
  weights[0] * primitive.tragets[0].POSITTION +
  weights[1] * primitive.tragets[1].POSITTION;

Fig. 6 jointMatrix(j) =
   globalTransformOfNodeThatTheMeshisAttachedTo^-1 *
   globalTransformOfJointNode(j)*
   inverseBindMatrixForJoint(j);

Fig. 8

```
class SkinPrimitivesConfigBox extends FullBox('scob', 0, 0)  {
    unsigned int (8) mesh_index;
    unsigned int (8) joint_sets_minusl;
    unsigned int (7) reserved;
    unsigned int(l) dynamic_flag;
    if (dynamic_flag == 0){
        unsigned int(32) static_num_vertices;
    }
}
```

Fig. 9

```
aligned(8) SkinPrimitiveSample() {
    if (dynamic_flag == 1) {
        unsigned int(32) num_vertices;
    }
    for (unsigned int i = 0; i < num_vertices; I++){
    for (unsigned int j =  0;j < joint_sets_minus1; j++){
unsigned int (8)[4] joints [i][j];
    unsigned int (32)[4] weights [i][j];
        }
    }
}
```

Fig. 10 poseBlendShapePosition = primitive.POSITION + weights * primitive.targets.POSITION;

Fig. 15 attribute vec4 a_joint;
attribute vec4 a_weight;
attribute vec3 a_poseBlendShapePosition;

uniform mat4 u_jointMat[2];

...
void main(void)
{
   mat4 skinMat =
     a_weight.x * u_jointMat[int(a_joint.x)] +
     a_weight.y * u_jointMat[int(a_joint.y)] +
     a_weight.z * u_jointMat[int(a_joint.z)] +
     a_weight.w * u_jointMat[int(a_joint.w);]

vec4 pos = u_modelViewMatrix * skinMat *
                                    vec 4(a_poseBlendShapePosition, 1.0);
   gl_Position = u_projectionMatrix * pos;
}

Fig. 16

```
class PoseMorphTargetConfigBox extends FullBox('pmtb', 0, 0) {
    unsigned int (8)  mesh_index;
    unsigned int (7)  reserved;
    unsigned int (1)  default_pose_present_flag;
    unsingned int (32) number_of_vertices;
    unsingned int (32) number_of_morph_targets;
}
```

Fig. 17

```
aligned(8) PoseMorphTargetSample() {
    for (unsigned int(32) i = 0; i < number_of_morph_targets; I++){
        if (default_pose_present_flag == true) {
            unsigned int (32) weights[i];
        }
        for (unsigned int (32) j = 0; j < number_of_vertices; j++){
            signed int (32) pos_x[j];
            signed int (32) pos_y[j];
            signed int (32) pos_z[j];
        }
    }
}
```

Fig. 18

```
aligned(8) DefaultPoseUpdateSample() {
    for (unsigned int(32) i = 0; i < number_of_morph_targets; I++){
        if (default_pose_present_flag == true) {
            unsigned int (32) weights[i];
        }
    }
}
```

Fig. 19

```
"meshes"
: [ {
    "primitives" : [ {
        "attributes" : {
            "POSITION" : 1,
            "JOINTS_0" : 2,
            "WEIGHTS_0" : 3
        },
        "indices":0,
        "mode": 4
    }, {
    "primitives" : [ {

"POSITION" : 5,

},
    "extensions":[
        "name" : Mesh-dependent()
        "MPEG_primitives": {
        {
            "mesh" : 6
            "algorithm" : ENUM_ALGO
        },
        "indices" : 7
    ]
}
],
```

Fig. 24

```
{
  "scenes" : [ {
    "nodes" : [ 0 ]
  } ],

"nodes" : [ {
    "skin" : 0,
    "mesh" : 0,
    "children" : [ 1 ]
  }, {
    "children" : [ 2 ],
    "translation" : [ 0.0, 1.0, 0.0 ]
  }, {
    "rotation" : [ 0.0, 0.0, 0.0, 1.0 ]
  } ], "meshes"
  [ {
    "name" : "MODEL"
    "primitives" : [ {
      "attributes" : {
        "POSITION" : 1,
        "JOINTS_0" : 2,
        "WEIGHTS_0" : 3
      },
      "targets" : [
        {
          "POSITION" : 4
        },
        {
          "POSITION" : 5
        }
      ],
      "extensions":[
        "MPEG_primitives": {
          "attributes" : {
            "POSITION" : 6
            "TEXCOORD_0" : 8
```

```
            "CORRESPONDENCE" : 0
          },
          "material" : 1
        }
      ],
      "indices" : 0
    }
  ],
  "weights" : [
    1.0,
    0.5
  ]
  }
  ],
  "skins" : [ {
    "inverseBindMatrices" : 4,
    "joints" : [ 1, 2 ]
  }, ], "animations" : [ {
    "channels" : [ {
      "sampler" : 0,
      "target" : {
        "node" : 2,
        "path" : "rotation"
      }
    } ],
    "samplers" : [ {
      "input" : 8,
      "interpolation" : "LINEAR",
      "output" : 9
    } ]
  } ], "buffers" : ..., "bufferViews" : ...
  ], "accessors" : ...,
}
```

Fig. 25

```
"meshes"
: [ {
    "primitives" : [ {
        "attributes" : {
            "POSITION" : 1,
            "JOINTS_0" : 2,
            "WEIGHTS_0" : 3
        },
        "indices": 0,
        "mode": 4
    }, {
      "primitives" : [ {

"attributes" : {
              "POSITION" : 5,
  . . .
  . . .
          },
          "extensions":[
              "name" : "Mesh-dependent"
              "MPEG_primitives": {
                  {
                      "CORRESPONDENCE" : 6
                  {,
                  "mesh" : 0
              ]
      }
    ],
```

Fig. 26

| name | Accessor. Type(s) | Accessor. Component Type(s) | description |
|---|---|---|---|
| CORRESPONDENCE | SCALAR | UNIT | vertex correspondence to a different mesh |

Fig. 27

| name | Accessor. Type(s) | Accessor. Component Type(s) | description |
|---|---|---|---|
| CORRESPONDENCE | VEC3 | FLOAT | vertex correspondence to a different mesh |

Fig. 28

```
"meshes" : [
    {
        "primitives" : [ {
            "attributes" : {
                "POSITION" : 0
            }
        } ]
    }
],
"bufferViews" : [
    {
        "buffer" : 0,
        "byteOffset" : 0,
        "byteLength" : 36,
        "target" : 34962
    }
],
"accessors" : [
    {
        "bufferView" : 0,
        "byteOffset" : 0,
        "componentType" : 5126,
        "count" : 3,
        "typet" : "VEC3",
        "max" : [ 1.0, 1.0, 0.0 ],
        "min" : [ 0.0, 0.0, 0.0 ],
    }
],
```

Fig. 29

| name | Accessor. count | Accessor. Type(s) | Accessor. Component Type(s) | description |
|---|---|---|---|---|
| CORRESPONDENCE | *number of vertices* | VEC3 | FLOAT | vertex correspondence to a different mesh |

Fig. 30

| name | Accessor. count | Accessor. Type(s) | Accessor. Component Type(s) | description |
|---|---|---|---|---|
| CORRESPONDENCE | *number of vertices* | SCALAR | UNIT | vertex correspondence to a different mesh |

Fig. 31

```
class VerticesCorrespondenceSampleEntry(type) extends MetaDataSampleEntry(type) {
    VerticesCorrespondenceConfigBox (); // mandatory
    Box[] other_boxes; // optional
} class VerticesCorrespondenceConfigBox extends FullBox('vcor', 0, 0) {
    unsigned int(8) correspondence_type;
    if (correspondence_type == 0) {
        unsigned int(8) correspondences_length;
    } else if (correspondence_type == 2 || correspondence_type == 3 ){
        unsigned int(32) number_of_vertices
    }
    bit(7) reserved = 0;
    unsigned int(1) dynamic_flag;
    if (dynamic_flag == 0) {
        unsigned int(32) static_num_correspondences;
    }
}
```

Fig. 32

```
aligned(8) VerticesCorrespondenceSample() {
    if (dynamic_flag == 1) // if equal to 0 num_correspondences =
static_num_correspondences
        unsigned int(32) num_correspondences;
    for (i = 0; i < num_correspondences; i++){
        if (correspondence_type == 0)
            unsigned int(8* correspondences_length) correspondences[i]
        if (correspondence_type == 1){
            unsigned int(32) pos_x;
            unsigned int(32) pos_y;
            unsigned int(32) pos_z;
        } else if (correspondence_type == 2) {
                for (unsigned int(32) j = 0 ; j < number_of_vertices; j++){
            unsigned int(32) vertex_index[j];
}
        }
            else if (correspondence_type == 3) {
                for (unsigned int(32) j = 0; j < number_of_vertices; j++){
            signed int (32) pos_x;
            signed int (32) pos_y;
            signed int (32) pos_z;
                vertex[j]{pos_x, pos_y, pos_z};
}
}
    }
}
```

Fig. 33

```
class VerticesCorrespondenceConfigBox extends FullBox('vcor', 0, 0) {
    unsigned int(8) referenced_mesh;
    unsigned int(8) correspondence_type;
    if (correspondence_type == 0) {
        unsigned int(8) correspondences_length;
    }
    bit(7) reserved = 0;
    unsigned int(1) dynamic_flag;
    if (dynamic_flag == 0) {
        unsigned int(32) static_num_correspondences;
    }
}
```

Fig. 34

```
aligned(8) VerticesCorrespondenceSample() {
    unsigned int(8) referenced_mesh;
    if (dynamic_flag == 1) // if equal to 0 num_correspondences = static_num_correspondences
        unsigned int(32) num_correspondences;
    for (i = 0; i < num_correspondences; i++){
        if (correspondence_type == 0)
            unsigned int(8* correspondences_length) correspondences[i]
        if (correspondence_type == 1){
            unsigned int(32) pos_x;
            unsigned int(32) pos_y;
            unsigned int(32) pos_z;
        }
    }
}
```

Fig. 35

```
"meshes":
[ ...
{
    "primitives" : [ {
        "attributes" : {
            "POSITION" : 5,
        },
        "extensions":[
            "MPEG_primitives": {
                {
                    "CORRESPONDENCE": 6
                },
            ]
        "indices" : 7
    } ],
    "extensions" :
        "MPEG_media" : {
            "source" : 1,
            "track" : 1,
            "timedAccessors" : 6
        }
    }
}
]
```

Fig. 36

```
{
    "scenes" : [ {
        "nodes" : [ 0 ]
    } ],

"nodes" : [ {
        "skin" : 0,
        "mesh" : 0,
        "children" : [ 1 ]
    }, {
        "children" : [ 2 ],
        "translation" : [ 0.0, 1.0, 0.0 ]
    }, {
        "rotation" : [ 0.0, 0.0, 0.0, 1.0 ]
    } ]
}
```

Fig. 37

```
"animations" : [ {
    "channels" : [ {
        "sampler" : 0,
        "target" : {
            "node" : 2,
            "path" : "rotation"
        }
    } ],
    "samplers" : [ {
        "input" : 8,
        "interpolation" : "LINEAR",
        "output" : 9
    } ]
} ],
```

Fig. 38

```
class JointsConfigBox extends FullBox('jcob', 0, 0) {
    unsigned int(8) number_of_joints_to_transform;
    for (unsigned int i= 0 , i < number_of_joints_to_transform; i++){
              unsigned int (8) joints_to_transform[i];
    }
    unsigned int(1) transform_type_flag;
    if (transform_type_flag == 0){
              unsigned int(2) transform_property;
}

```
aligned(8) JointsTransformationSample() { for (unsigned int(32) i = 0 ; i < number_of_joints_to_transform; i++){
        if (transform_type_flag == 0){
            if (transform_property == 0){
                signed int (32) translation_x;
                signed int (32) translation_y;
                signed int (32) translation_z;
            } else if (transform_property == 1){
                signed int (32) rotation_w;
                signed int (32) rotation_y;
                signed int (32) rotation_y;
                signed int (32) rotation_z;
            } else if (transform_property == 2){
                signed int (32) scale_x;
                signed int (32) scale_y;
                signed int (32) scale_z;
            }
        } else if (transform_type_flag == 1){
            for (unsigned int (32) j = 0 ; j < 16; j++){
                signed int (32) matrix[j]
            }
        }
    }
}
```

Fig. 40 ered in a scene description language. Further embodiments refer to devices for generating such data streams, devices for evaluating such data streams, methods of generating such data streams, and methods of evaluating such data streams. Further embodiments refer to a computer program product.

DATA STREAM, DEVICES AND METHODS FOR VOLUMETRIC VIDEO DATA

CROSS-REFERENCE TO RELATED APPLICATIONS

This application is a continuation of copending International Application No. PCT/EP2021/076917, filed Sep. 30, 2021, which is incorporated herein by reference in its entirety, and additionally claims priority from European Application No. EP 20199853.1, filed Oct. 2, 2020, which is also incorporated herein by reference in its entirety.

The invention is within the technical field of volumetric video.

Embodiments of the invention refer to data streams having volumetric video data encoded therein in a scene description language. Further embodiments refer to devices for generating such data streams, devices for evaluating such data streams, methods of generating such data streams, and methods of evaluating such data streams. Further embodiments refer to a computer program product.

BACKGROUND OF THE INVENTION

Volumetric video is becoming more and more important lately. It is envisioned that in a near future volumetric video streaming will become a popular service that can be consumed for several applications in the area of Virtual Reality (VR), Augmented Reality (AR) and Mixed Reality (MR). The expectations of such applications based on volumetric video is that the content is represented in high-quality (photorealistic) and that it gives the impression that it is real which would lead to an immersive experience.

Volumetric video represents 3-D content, which can be real objects captured by camera rigs. In the past, extensive work has been carried out with 3-D computer graphics based heavily on Computer-generated imagery (CGI). The images may be dynamic or static and are used in video games or scenes and special effects in films and television.

With the late advances in volumetric video capturing and emerging HMD devices, VR/AR/MR have raised a lot of attention. Services enabled thereby are very diverse but consist mainly of objects being added on-the-fly to a given real scene, generating thus a mixed reality, or even added to a virtual scene if VR is considered. In order to achieve a high-quality, and an immersive experience, the 3-D volumetric objects need to be transmitted at high-fidelity, which could demand a very high bitrate.

There are two type of services that can be envisioned. The first one, corresponds to a "passive" consumption of volumetric content, in which the objects added to a scene do not interact with the environment or have a limited interaction in the form of pre-defined animations that are activated as a response to, for instance, a mouse-click or key being pressed. A second, and more challenging service is an interactive scenario, where the content (volumetric video) is provided in such a way that the application is able to animate the object interacting with the user, e. g. following a user by turning the head, a person that is inserted into the scene . . . .

For the first case ("passive" consumption with predefined animations), one could imagine the following solution:
Volumetric video sequence: sequence of encoded frames of an object that reflects the intended animation
3D-object with additional metadata that allows predefined animation of the 3D-object For the second case (interactive object), one could imagine the following solution:
3D-object with additional metadata that allows freely animating the 3D-object The Volumetric video sequence streaming solution for the second case is not currently feasible unless there is a server to client coupled system in which the interactive animation is generated on-the-fly at the server as a response to what happens at the client side which is a highly undesirable design due to the associated resource cost.

Therefore, it is desired to provide concepts for rendering volumetric video coding more efficient to support among other things a generation of a mixed reality. Additionally or alternatively, it is desired to provide high-quality and to reduce a bit stream and thus a signalization cost to enable a high-fidelity at a transmission of 3-D volumetric objects.

SUMMARY

An embodiment may have a device for evaluating a data stream configured to: evaluate one or more objects of volumetric video data from a data stream into which the one or more objects are encoded in a scene description language, the data stream representing a scene including one or more objects; and retrieve from the data stream for at least one object at least first mesh data, second mesh data and correspondence information, wherein the first mesh data describes the at least one object with a first mesh; the second mesh data describes the at least one object with a second mesh; and wherein the correspondence information indicates a mapping between the first and second mesh.

According to another embodiment, a method of evaluating a data stream may have the steps of: evaluating one or more objects of volumetric video data from a data stream into which the one or more objects are encoded in a scene description language, the data stream representing a scene including one or more objects; and retrieving from the data stream for at least one object at least first mesh data, second mesh data and correspondence information, wherein the first mesh data describes the at least one object with a first mesh; the second mesh data describes the at least one object with a second mesh; and wherein the correspondence information indicates a mapping between the first and second mesh.

Another embodiment may have a non-transitory digital storage medium having a computer program stored thereon to perform the inventive method of evaluating a data stream, when said computer program is run by a computer.

In this document, some basic concepts used for 3D content transmission formats, animations are described. It is followed by an exploration of different approaches to enable volumetric video animations. In particular, the chapter "Introduction to vertex correspondence" is targeted to enable correspondence between two mesh geometries, wherein transformation in one mesh can be easily translated over to the other mesh using the correspondence property. This method would enable application to animate volumetric videos.

In accordance with a first aspect of the present invention, the inventors of the present application realized that one problem encountered when trying to update a mesh associated with an object stems from the fact that the updated mesh might differ from the previously used mesh in terms of a number of vertices representing the object, that the updated mesh might not comprise information for enabling animations of the object and/or that an amount of information needed to allow animation of the object would involve transmitting a lot of data together with the updated mesh.

According to the first aspect of the present application, this difficulty is overcome by using correspondence information. The correspondence information indicates a mapping between two meshes associated with the same object. The inventors found, that it is advantageous to provide the correspondence information, because the correspondence information enables, for example, to apply animation information associated with one of the two meshes to the other mesh or to determine a relative change of a pose of the object, which pose is associated with one of the two meshes, in response to an animation of the other mesh using the correspondence information. Therefore, it is not necessary to provide animation information for the second mesh, since the animation of the second mesh can be mimicked/imitated by a corresponding animation of the first mesh using the correspondence information. This is based on the idea that the amount of data in a data stream can be reduced, if the data stream comprises the correspondence information instead of animation information. The second mesh might represent an update of the first mesh, wherein the first mesh differs from the second mesh, for example, in terms of the number of vertices. The correspondence information allows to apply the animation information associated with the first mesh to the second mesh even if the first mesh differs from the second mesh, since the correspondence information comprises, for example information on how the vertices and/or faces of the two meshes are linked. Therefore, for example, the data stream might comprise for this object only animation information associated with the first mesh and not for updates of the first mesh, like, for example, for the second mesh.

Accordingly, in accordance with a first aspect of the present application, a data stream having volumetric video data encoded therein in a scene description language represents a scene comprising one or more objects, e. g. volumetric objects or 3D-objects. The data stream comprises for at least one object of the one or more objects first mesh data, second mesh data and correspondence information. The first mesh data describes the at least one object with a first mesh, the second mesh data describes the at least one object with a second mesh and the correspondence information indicates a mapping between the first and second mesh. In case the data stream comprises for one object the first mesh data, the second mesh data and the correspondence information, the first mesh data describes this object with the first mesh and the second mesh data describes this object with the second mesh. In case the data stream comprises for two or more objects first mesh data, second mesh data and correspondence information, for each of the two or more objects, the respective first mesh data describes the respective object with a first mesh and the respective second mesh data describes the respective object with a second mesh and the correspondence information indicates a mapping between the respective first and second mesh. The first mesh data may describe the first mesh by means of defining the first mesh's vertices and may additionally comprise information (could be called face data) on how to define faces between the vertices or defining some kind of vertex relationship among the vertices from which the faces may be derived. The second mesh data may describe the second mesh by means of defining the second mesh's vertices and may additionally comprise information on how to define faces between the vertices or defining some kind of vertex relationship among the vertices from which the faces may be derived. The first and/or second mesh might represent a surface representation of the object. Optionally, the first mesh might be understood as a first skin of the object and the second mesh might be understood as a second skin of the object.

Accordingly, in accordance with a first aspect of the present application, a device for generating (or evaluating) the data stream is configured to generate (or evaluate) the one or more objects of volumetric video data into (or from) the data stream in a scene description language, the data stream representing the scene comprising the one or more objects. Additionally, the device for generating is configured to provide the data stream for at least one object at least with the first mesh data, the second mesh data and the correspondence information and the device for evaluating is configured to retrieve from the data stream for at least one object at least the first mesh data, the second mesh data and the correspondence information. The first mesh data, the second mesh data and the correspondence information are already explained above in the context of the data stream.

According to an embodiment, the device for evaluating is a head-mounted-display device, a mobile device, a tablet, an edge server, a server or a client.

According to an embodiment, the device for evaluating the data stream is configured to generate a presentation of the at least one object by evaluating the first mesh data, the second mesh data and the correspondence information. The correspondence information might be used to improve the presentation in terms of temporal continuity, e.g. by temporally filtering the presentation between the first and second time stamp. Alternatively, the correspondence information may indicate a mapping between vertices and/or faces of the second mesh and the first mesh in a predetermined pose of the object. For example, the mapping indicates a plurality of vertex-to-face correspondences, e.g. for each vertex of the plurality of vertices of the second mesh, a vertex-to-face correspondence might be indicated, wherein a vertex-to-face correspondence indicates for a vertex of the second mesh a corresponding face of the first mesh. The generation might involve subjecting the first mesh to a transformation so that the first mesh describes the object in the predetermined pose, computing, for each indicated vertex-to-face correspondence of the plurality of vertex-to-face correspondences, a relative offset between the respective vertex of the second mesh and the corresponding face of the first mesh, subjecting the first mesh to a transformation so that the first mesh describes the object in a further pose, and applying the relative offset to the resulting transformed first mesh so that the resulting second mesh describes the object in the further pose.

The predetermined pose might correspond to a pose, e.g. an initial pose, of the second mesh. The pose of the second mesh might be indicated in the data stream by the correspondence information. Thus, the first mesh and the second mesh describe the object in the same pose, i.e. the predetermined pose, at the computing of the relative offset.

The data stream, the device for generating the data stream and/or the device for evaluating the data stream might comprise one or more of the features described in the following.

The first mesh and the second mesh, for example, comprise each a plurality of vertices and a plurality of faces, wherein an area spanned by a set of three or more vertices of the plurality of vertices forms a face of the plurality of faces. A vertex, for example, represents a point/position in three dimensions and a face, for example, represents a plane defined by the three or more vertices, e. g. an area enclosed by Connection-lines, e. g. edges, between the three or more vertices. Each vertex of the plurality of vertices might be associated with an index or might be identifiable by its position in three dimensions. Each face of the plurality of faces might be associated with an index or might be associated with the indices of the three or more vertices associated with the respective face or might be identifiable by the positions of the three or more vertices associated with the respective face.

According to an embodiment, the mapping between the first and second mesh is one of a vertex to vertex mapping, a vertex to face mapping and/or a vertex to vertices mapping. According to an embodiment, the correspondence information indicates whether the mapping is indicated using indices of the vertices and/or faces or whether the mapping is indicated not using indices of the vertices and/or faces or whether the mapping is indicated using a combination of indices and non-indices.

At the vertex to vertex mapping, e. g. an index may be spent for each vertex of one of the meshes, which points to one or more corresponding vertices in the other mesh. Based on the correspondence information, for each vertex of the plurality of vertices of the second mesh, an offset between a position of the respective vertex and a position of a corresponding vertex of the plurality of vertices of the first mesh can be computed. In other words, for pairs of two vertices an offset between positions of the two vertices might be computable, wherein the plurality of vertices of the first mesh and of the second mesh are grouped into the pairs of two vertices and wherein the pairs of two vertices comprise a vertex of the second mesh and a corresponding vertex of the first mesh. The correspondence information might indicate the vertices by indicating the indices of the vertices or by indicating the positions of the vertices in three dimensions or by indicating for one vertex the associated index and for the other vertex the associated position in three dimensions.

At the vertex to face mapping, e. g. using index, e. g. an index may be spent for each vertex of one of the meshes, which points to a corresponding face in the other mesh, or vice versa, an index may be spent for each face of one of the meshes, which points to one or more corresponding vertices in the other mesh. The correspondence information, for example, comprises an integer value that identifies the indexed face of the first mesh to which the corresponding vertex, e. g. an indexed vertex, of the second mesh applies. Based on the correspondence information the device for evaluating the data stream might be configured to, for each vertex of the plurality of vertices of the second mesh, determine/compute an offset, e.g. a relative offset, between a position of the respective vertex and a position of a projection of the vertex into a corresponding face of the plurality of faces of the first mesh. In other words, a distance between the respective vertex of the second mesh and the corresponding face of the first mesh might be determinable/computable based on the correspondence information. The correspondence information, for example, links a vertex of the second mesh with a face of the first mesh. For each vertex of the plurality of vertices of the second mesh, the correspondence information might indicate the vertex by indicating the index of the vertex or by indicating the position of the vertex in three dimensions and the correspondence information might indicate the corresponding face of the plurality of faces of the first mesh by indicating the index of the corresponding face or by indicating the positions of the vertices associated with the corresponding face.

At the vertex to vertices mapping, e. g. an index may be spent for each vertex of one of the meshes, which points to a set of corresponding vertices in the other mesh. For example, for each vertex of one mesh the correspondence information defines an n tuple of vertex positions x,y,z-s that define a face of the other mesh which corresponds to the respective vertex of the mesh. Based on the correspondence information, for each vertex of the plurality of vertices of the second mesh, offsets between a position of the respective vertex and the positions of the set of corresponding vertices of a plurality of vertices of the first mesh are computable. For example, for a certain vertex of the plurality of vertices of the second mesh, the set of corresponding vertices comprises a first vertex at a first position, a second vertex at a second position and a third vertex at a third position. A first offset between the position of the certain vertex and the position of the first vertex, a second offset between the position of the certain vertex and the position of the second vertex and a third offset between the position of the certain vertex and the position of the third vertex might be computable. The correspondence information might indicate the vertices by indicating the indices of the vertices or by indicating the positions of the vertices in three dimensions or by indicating for one vertex the associated index and for the other vertices the associated position in three dimensions or vice versa.

According to an embodiment, the first mesh data comprises transformation information for a transformation of the first mesh so as to describe different poses of the at least one object. The transformation information, for example, indicates joints and/or bones of the object to which a transformation is to be applied and, for example, for each of the indicated joints and/or bones, a specific transformation.

According to an embodiment, the transformation information indicates the transformation for a time stamp associated with the second mesh. The first mesh can be transformed so that the pose described by the transformed first mesh is the same as the pose described by the second mesh at the time stamp to enable a determination of offsets or inter-mesh distances for corresponding vertices and faces indicated by the correspondence information. The determined offsets or inter-mesh distances can be used to correct a further transformed first mesh, e.g. obtained by applying a further transform indicated by the transformation information or by further transformation information, so that a corrected further transformed first mesh represents the second mesh describing the object in a further pose.

According to an embodiment, the transformation information comprises one or more of skeleton data and one or more morph targets for each of a set of vertices of the first mesh or for each of a set of vertices of the first mesh, a vertex position for each of the different poses of the at least one object. The skeleton data comprises bones data, joint data, and/or weight data for skinning. Skinning might be understood as a binding/attaching of the mesh/skin, e. g. the first mesh, of the object to a virtual skeleton/rig of the object, so that the mesh/skin is movable in response to a transformation/movement of the skeleton/rig. The skeleton/rig might be defined by bones and joints indicated by the bones data and joint data, wherein two bones are connected by a joint. The weight data, for example, indicates one or more weights for each vertex of first mesh's vertices, wherein the one or more weights indicate how much each bone or joint contributes or affects each vertex or the one or more weights indicate how much one or more bones or joints contribute or affect each vertex. A morph target of the one or more morph targets, for example, defines a 'deformed' version of the first mesh as a set of positions of vertices, wherein the morph target, for example, comprises for each of a set of vertices of the first mesh a position.

According to an embodiment, the transformation relates to an animation, skin modification, e. g. a mesh modification, or morphing of the at least one object.

According to an embodiment, the transformation information comprises one or more of a type of transformation, scaling, rotation, translation values or a matrix as a combination thereof. In other words, the transformation information comprises one or more of a type of transformation, like a scaling, a rotation or a translation. Additionally or alternatively, the transformation information might comprise scaling values, rotation values, translation values or a matrix as a combination thereof.

According to an embodiment, the correspondence information comprises/provides application information for applying the transformation of the first mesh to the second mesh. The second mesh, i.e. a dependent mesh, can be transformed/animated by relying on the first mesh, i.e. a shadow mesh. The application information is, e. g., indirectly provided by providing the correspondences between vertices and/or faces of the second mesh and the first mesh in a predetermined pose so as that information on a relative offset between these mutually corresponding vertices and/or faces of the second mesh and the first mesh in that predetermined pose of the object may be determined which may then be adopted in further poses of the at least one object by subjecting the first mesh to the transformation and applying the relative offset to the resulting transformed first mesh. The predetermined pose might correspond to an initial pose defined by the second mesh. In case of the second mesh being an update of the first mesh at a second time stamp, the predetermined pose might correspond to a pose defined by the second mesh at the second time stamp, wherein the first mesh data might relate to a first time stamp. The first mesh data, for example, describes the object, e. g. the at least one object, with the first mesh defining a first position and a first pose of the object and the second mesh data, for example, describes the object with the second mesh defining a second position and a second pose of the object. The transformation information, for example, indicates a first transformation of the first mesh so that the first position is equal to the second position and the first pose is equal to the second pose. Thus, the first mesh is aligned with the second mesh by applying the first transformation onto the first mesh. The pose and/or position that the second mesh corresponds to, can be used to transform the first mesh so that the first and second mesh are at the same pose and/or position. The device for evaluating the data stream might be configured to determine, based on the correspondence information, for example, relative offsets, e.g. distances or relative locations, between the mutually corresponding vertices and/or faces of the second mesh and the first mesh for a pose and/or position at which the first mesh is aligned with the second mesh. The transformation information, for example, indicates further transformations of the first mesh to adopt same to a further pose of the object by subjecting the first mesh to one of the further transformations and applying the relative offset to the resulting transformed first mesh, e. g. to determine positions of vertices and/or faces of the second mesh which would correspond to positions of vertices and/or faces of the second mesh transformed by the one of the further transformations. This is based on the idea that the same or nearly the same result can be achieved by transforming the first mesh and using the correspondence information as by directly transforming the second mesh.

According to an embodiment, the first mesh data relates to a first time stamp and the second mesh data relates to a second time stamp wherein the second mesh is an update of the first mesh. The correspondence information, for example, comprises/provides application information for applying the transformation of the first mesh to the second mesh, wherein the first mesh data comprises transformation information for the transformation of the first mesh so as to describe different poses of the at least one object. Alternatively, the second mesh data, for example, comprises further transformation information for a further transformation of the second mesh so as to describe different poses of the at least one object. Thus, it is possible to transform the second mesh independent of the first mesh or to transform the second mesh by transforming the first mesh and using the correspondence information and additionally using the further transformation. For example, based on the correspondence information, a relative offset between vertices and/or faces of the first mesh describing a first predetermined pose of the object at the first time stamp among a first set of predetermined poses which the object may adopt by the subjection of the first mesh to the transformation and vertices and/or faces of the second mesh describing a second predetermined pose of the object at the second time stamp among a second set of predetermined poses which the object may adopt by the subjection of the second mesh to the transformation is determinable.

According to an embodiment, the first mesh data and/or the second mesh data comprises skeleton data describing a skeleton pose of the at least one object. The skeleton data might comprise information on positions of bones and joints of a skeleton or rig, wherein at least two bones are connected by a joint. The skeleton pose, for example, is defined by the position or location of the bones and joints inside the at least one object. The skeleton data might indicate a hierarchical dependence between the bones of the skeleton or rig. Therefore, the displacement of a bone, for example, is a combination of its own transformation and a transformation of a parent bone. For example, based on the hierarchical dependence, a bone hierarchically dependent on a parent bone might also be displaced in response to a displacement of the parent bone.

According to an embodiment, the second mesh comprises more vertices than the first mesh. Especially in this case the usage of the correspondence information results in an efficient generation and evaluation of volumetric video and a signalization cost for the data stream might be reduced. It is, for example, possible to provide only for the first mesh transformation information and to transform the second mesh by transforming the first mesh and using the correspondence information. Thus, the mesh of the respective object can be easily adapted during a volumetric video sequence, e. g. the mesh describing the object can differ during a volumetric video sequence in terms of a number of vertices. Even at such an adaptation, a high efficiency at a generation and/or evaluation of the volumetric video sequence is maintained and the signalization cost for the data stream is not significantly increased. According to an embodiment, the second mesh might be associated with 'enhancement' information of a mesh describing the object and the first mesh might be associated with 'basic' information of the mesh describing the object. The first mesh might represent a 'base mesh' and the second mesh might represent an 'enhancement mesh'. The texture for both the meshes might not be the same, i.e. the first mesh data might comprise texture information for a texture of the first mesh and the second mesh data might comprise texture information for a texture of the second mesh, wherein the texture information for the texture of the first mesh differs from the texture information for the texture of the second mesh in terms of resolution. For example, the resolution of the texture of the second mesh is higher than the resolution of the texture of the first mesh. Thus, it is possible to describe the object in the data stream with different qualities. According to an embodiment, only the first mesh data comprises transformation information for transforming the first mesh, i. e. the low complexity mesh, and the second mesh data does not comprise transformation information for transforming the second mesh, wherein the second mesh describes the object at a higher quality than the first mesh, since the second mesh comprises more vertices than the first mesh. The transformation information for transforming the first mesh can be used together with the correspondence information to perform a transformation, e. g. of the first mesh, resambling/mimicking/imitating a corresponding transformation of the second mesh.

According to an embodiment, the second mesh data comprises texture information for a texture of a mesh, i.e. for the second mesh. The texture information might comprise a metalness value, e. g. indicating reflection characteristics of the mesh. Additionally, the texture information might comprise information on whether an area of the mesh is occluded from light and thus rendered darker and/or information on a color of light that is emitted from the mesh.

According to an embodiment, the first mesh is constant over time and/or the second mesh is varying over time. As already mentioned above, the second mesh might represent an update of the first mesh, wherein the mesh of the object can be updated at multiple time stamps in a volumetric video sequence. Therefore, the data stream might comprise the first mesh associated with a first time stamp, a first second mesh associated with a second time stamp and a second second mesh associated with a third time stamp, wherein the first second mesh and the second second mesh differ in terms of a number of vertices. The first second mesh and the second second mesh, for example, have in common that no transformation information is provided. The data stream might only comprise transformation information associated with the first mesh.

According to an embodiment, the data stream comprises further second mesh data. The device for generating the data stream might be configured to provide the data stream with the further second mesh data and the device for evaluating the data stream might be configured to retrieve from the data stream the further second mesh data. The further second mesh data defines an update of the second mesh, wherein the data stream indicates a first pose of the at least one object to which the first mesh data relates to, and a second pose of the at least one object to which the second mesh data relates to. The correspondence information indicating the mapping between the first mesh and the second mesh might relate to a correspondence determined for the case that the pose of the object is the same for the first mesh and the second mesh. The poses of the object relating to the first mesh data and the second mesh data are provided in the data stream, for example, to enable a derivation of the correspondence information from the data stream by transforming the first mesh resulting in a transformed first mesh, so that the pose of the at least one object to which the transformed first mesh data relates to matches the second pose of the at least one object to which the second mesh data relates to, e. g., if the first pose is not the same as the second pose. The correspondence information might indicate mutually corresponding portions (vertices/face) of the first mesh and the second mesh (see, e. g., vertex-to-face correspondence) and, for each pair of mutually corresponding portions, an inter-mesh distance between the two portions of the pair of mutually corresponding portions might be computable by the device for evaluating the data stream. For example, the first and second poses might be adoptable by the first mesh by a transformation using corresponding transformation information associated with the first mesh, and the first pose might be the one for which the correspondence information is made to determine the inter-mesh distance of mutually corresponding portions (vertices/face) of the mashes which may then be used for other poses as well. The data stream, for example, indicates additionally a third pose of the at least one object to which the further second mesh data relates to, wherein the third pose might be the same pose as the second pose. Further correspondence information indicating the mapping between the first mesh and the updated second mesh might be derivable as described for the mapping between the first mesh and the second mesh. According to an embodiment, the further second mesh data defines an update of the second mesh by defining a difference between the old second mesh and the updated version of the second mesh, e. g. a difference of positions of vertices and/or faces between the two meshes and/or a difference in a number of vertices and/or faces between the two meshes. Updated correspondence information may be needed in this case. Alternatively, the further second mesh data defines an update of the second mesh by defining transformations of the second mesh resulting in the updated second mesh. No updated correspondence information may be needed in this case.

According to an embodiment, the correspondence information comprises evaluation information for evaluating the video stream, i.e. the data stream, e. g. the data stream comprising information for a volumetric video sequence. According to an embodiment, the evaluation information indicates an algorithm to be used for the evaluating. According to an embodiment, the evaluation information comprises a pointer to an algorithm to be used for deriving the mapping out of a set of algorithms. The algorithm, for example, is configured to determine inter-mesh distances of mutually corresponding portions (vertices/face) of the two mashes, i.e. of the first mesh and the second mesh. For example, the algorithm is configured to determine, for each vertex of the plurality of vertices of the second mesh, an offset between a position of the respective vertex and a position of a projection of the vertex into a corresponding face of a plurality of faces of the first mesh. According to an embodiment, the evaluation information comprises an indication of a pose of the at least one object at which the algorithm is to be applied for the derivation of the mapping. The indicated pose might represent a pose of the object described by the second mesh or represents a neutral pose, like a so called T pose. The algorithm can be configured to control whether a pose of the at least one object described by the first mesh matches the pose indicated by the evaluation information. If the pose described by the first mesh does not match the pose indicated by the evaluation information, the algorithm, for example, is configured to use transformation information associated with the first mesh to transform the first mesh so that a pose described by the first mesh matches the pose indicated by the evaluation information and derive the mapping, e. g. the inter-mesh distances or offsets. If the pose described by the first mesh matches the pose indicated by the evaluation information, the algorithm, for example, is configured to derive the mapping, e. g. the inter-mesh distances or offsets.

According to an embodiment, the first mesh data and/or the second mesh data, comprises two or more meshes, each comprising a plurality of vertices, wherein one of the two or more meshes is an extension of another one of the two or more meshes.

According to an embodiment, the data stream further comprises a plurality of further mesh data relating to meshes, i.e. the plurality of meshes, and the correspondence information comprises association information, identifying the first and second mesh out of the plurality of meshes. Especially in case of only the first mesh data comprising the transformation information, the correspondence information might indicate that the transformation information associated with the first mesh can be used together with the correspondence information to transform the second mesh. In other words, the correspondence information might identify the first mesh as a 'shadow mesh' for the second mesh, wherein the second mesh might be understood as a 'dependent mesh'. The correspondence information might provide a reference to the 'shadow mesh', by specifying the mesh index in meshes array, associated to the dependent mesh for which correspondence values are established. The association information might indicate two meshes for which the mapping is indicated by the correspondence information. In other words, the association information might indicate the first mesh out of a plurality of meshes and/or the second mesh out of a further plurality of meshes. According to an embodiment, the first mesh and the second mesh are chosen out of the same plurality of meshes. The association information, for example, identifies which meshes are linked together. According to an embodiment, the device for generating the data stream might be configured to provide the data stream with the plurality of further mesh data and the device for evaluating the data stream might be configured to retrieve the plurality of further mesh data from the data stream.

According to an embodiment, the first mesh is an update of a previously transmitted first mesh and/or the second mesh is an update of the previously transmitted second mesh.

According to an embodiment, the mesh data for the mesh being an update of the corresponding previously transmitted mesh, comprises one or more of updated skeleton data, and/or updated joint data, and/or updated weight data, and/or updated transformation data, i.e. transformation information, and/or updated texture information, and/or updated number of vertices, and/or updated or new positions of one or more vertices, and/or an indication of the pose that the update corresponds to.

According to an embodiment, the first mesh is an update of a previously transmitted first mesh and the first mesh data, i.e. the mesh data for the mesh being an update of the corresponding previously transmitted mesh, comprises updated weight data and updated transformation information (additional information related to the mesh data can be updated, as described above). The updated transformation information, for example, specifies a number of joints (e. g., of the joint data or the updated joint data) or a number of bones (e. g., of the skeleton data or the updated skeleton data) for which the transformation of the first mesh is described by the transformation information and the updated transformation information indicates the joints or bones, e. g. by specifying the indices, for which the transformation of the first mesh is described by the transformation information. Additionally, for example, the updated transformation information indicates a number of morph targets for which the updated weight data provides weights associated with vertices of the first mesh.

According to an embodiment, the second mesh is an update of a previously transmitted second mesh and the second mesh data, i.e. the mesh data for the mesh being an update of the corresponding previously transmitted mesh, comprises one or more of updated skeleton data, and updated joint data, and updated texture information, and updated number of vertices, and updated or new positions of one or more vertices, and an indication of the pose that the update corresponds to. The pose corresponding to the update might be indicated as transformation information associated with the first mesh, e.g. the updated transformation information, wherein the transformation information indicates a transformation of joints to be applied onto the first mesh so that the first mesh describes the object in the pose corresponding to the update. The transformation indicated by the transformation information can be applied to the first mesh to bring it to the same position, e.g. the predetermined position, as the second mesh at a particular time that corresponds to the update of the second mesh. Thus, the first mesh or the updated first mesh can be transformed, so that a pose that the first mesh or the updated first mesh corresponds to/equals the pose that the updated second mesh corresponds to, to determine the mapping between the two meshes. Additionally, the correspondence information is an update of a previously transmitted correspondence information, since the skeleton data and/or the joint data and/or the number of vertices has been updated. The updated correspondence information indicates a mapping between the updated second mesh and the first mesh or an updated first mesh.

According to an embodiment, the correspondence information is an update of a previously transmitted correspondence information.

According to an embodiment, the updated correspondence information comprises one or more of length of correspondences values, which are configurable, number of correspondences, type of correspondences, for example vertex-to vertex, face-to-face, vertex-to-face, and/or vertex-to-vertices, and/or information including the length of the values of those correspondences. The length of correspondence values, i.e. the length of the values of those correspondences, might specify a precision of the correspondence values. The length of correspondence values, i.e. the length of the values of those correspondences, might be represented in bytes.

According to an embodiment, any of the data and/or information can be provided as a link in the data stream, linking to the actual data/or information. For example, the data and or information is saved in an accessor. For example, correspondence values can be stored in an accessor and the correspondence information in the data stream can indicate an index of the accessor to link the correspondence information to the actual correspondence values.

According to an embodiment, the linked data and/or information in the data stream refers to one or more of the scene description language, the scene, the object, the first mesh data, the first mesh, the second mesh data, the second mesh, one of the plurality of vertices, one of the vertices, the mapping, the transformation information, the transformation, the application information, the pose data, the pose, the skeleton data, the joint data, the weight data, the texture information, the texture, the evaluation information, the algorithm, and/or the association information.

According to an embodiment, the linked actual data is accessible on a network location.

According to an embodiment, the scene description language is based on the JSON standard.

According to an embodiment, the scene description language is in Graphics Library Transmission Format.

According to an embodiment, the second mesh data is a volumetric scan.

According to an embodiment, the second mesh data is recorded with one more camera in three-dimensional technology, or computer-generated.

In accordance with a second aspect of the present invention, the inventors of the present application realized that one problem encountered when trying to reproduce realistic scenarios with a volumetric video stems from the fact that in realistic scenarios a number of vertices representing the object typically varies over time. According to the second aspect of the present application, this difficulty is overcome by updating information associated with an object in a scene of a volumetric video over time. The inventors found, that it is advantageous to update mesh data describing the object with a first mesh and to update transformation information for a transformation of the first mesh. The first mesh, for example, comprises a plurality of vertices and a plurality of faces, wherein an area spanned by a set of three or more vertices of the plurality of vertices forms a face of the plurality of faces. Faces and vertices of meshes are described above in more detail. The first mesh can be transformed by the transformation, for example, by changing positions of a set of vertices out of the plurality of vertices of the first mesh according to the transformation information. The inventors realized that it is efficient to update mesh data together with transformation information and to indicate a number of vertices of the first mesh. This is based on the idea, that this implementation enables a change of the number of vertices of the first mesh over time, e. g. during the course of a timed volumetric video sequence. Therefore, a realistic scenario can be represented by the volumetric video data.

Accordingly, in accordance with a second aspect of the present application, a data stream having volumetric video data encoded therein in a scene description language represents a scene comprising one or more objects. The data stream comprises for at least one object updates of mesh data and transformation information. The mesh data describes the at least one object with a first mesh, and the transformation information, e. g. skinning information, represents information for a transformation of the first mesh so as to describe different poses of the at least one object. For each update, the mesh data describes the at least one object with the first mesh at a predetermined pose which first mesh is transformable towards the different poses by means of the transformation, and wherein the data stream signals a number of vertices of the mesh.

Accordingly, in accordance with a second aspect of the present application, the device for generating (or evaluating) the data stream is configured to generate (or evaluate) the one or more objects of volumetric video data into (or from) the data stream in a scene description language, the data stream representing the scene comprising the one or more objects. The device for generating is configured to provide the data stream for at least one object at least with the updates of the mesh data and the transformation information and, for each update, the number of vertices of the first mesh. The device for evaluating is configured to retrieve from the data stream for at least one object at least the updates of the mesh data and the transformation information and, for each update, the number of vertices of the first mesh. The mesh data and the transformation information are already explained above in the context of the data stream.

The data stream, the device for generating the data stream and/or the device for evaluating the data stream might comprise one or more of the features described in the following.

According to an embodiment, the data stream comprises configuration information which indicates whether the number of vertices remains constant or changes dynamically, wherein, if the number of vertices changes dynamically, the data stream signals the number of vertices of the mesh at each update. The device for generating the data stream might be configured to provide the data stream with the configuration information and the device for evaluating the data stream might be configured to retrieve from the data stream the configuration information.

According to an embodiment, at each update, the mesh data and the transformation information is updated.

According to an embodiment, the transformation information is updated at updates at which the number of vertices of the mesh changes, while the transformation information remains constant and left un-updated at updates at which the number of vertices does not change.

According to an embodiment, the transformation information comprises one or more of skeleton data comprising bones data, joint data, and/or weight data for skinning, and one or more morph targets.

According to an embodiment, the transformation information comprises skeleton data comprising bones data, joint data, and/or weight data for skinning, and one or more morph targets, wherein, at the updates, the one or more morph targets and the skeleton data are updated at different update rate.

In accordance with a third aspect of the present invention, the inventors of the present application realized that one problem encountered when trying to reproduce realistic scenarios with a volumetric video stems from the fact that in realistic scenarios a topology of the object typically varies over time. According to the second aspect of the present application, this difficulty is overcome by updating information associated with an object in a scene of a volumetric video over time. The inventors found, that it is advantageous to update pose-blend shape information. Pose-blend shape information, for example, provides information for correcting a mesh deformation problem, wherein the mesh deformation problem is a result from a transformation applied to the mesh. The inventors realized that it is advantageous to update pose-blend shapes, since the object can be easily morphed/adapted using the pose-blend shapes and thus a more realistic volumetric video can be achieved. For example, the pose-blend shapes can be updated due to a change on a number of vertices of the mesh. Therefore, if the topology of the object, e. g. the number of vertices representing the mesh of the object, changes over time a result of a transformation of the mesh can be improved with pose-blend shapes which are updated based on the new topology. It is also possible that the pose-blend shapes are updated in terms of changing an amount of pose-blend shapes associated with the object, e. g. increasing or decreasing the number of pose blend shapes. Thus, it is possible to achieve a realistic representation of the object and at the same time indicate only the relevant pose-blend shapes for the object achieving a high efficiency in generating and evaluating the data stream with the volumetric video data. According to this aspect it is possible to improve a representation of an object in a scene of a volumetric video, since the object can be described by different meshes and/or pose-blend shapes over time. The topology of the object can be adapted over time as it would be in a realistic scenario.

Accordingly, in accordance with a second aspect of the present application, a data stream having volumetric video data encoded therein in a scene description language represents a scene comprising one or more objects. The data stream comprises for at least one object mesh data which describes the at least one object with a first mesh, and transformation information, e. g. skinning information, for a transformation of the first mesh so as to describe different poses of the at least one object, and updates of pose-blend shape information, e. g. morph target information. The pose-blend shape information is indicative of a default pose to be adopted at rendering starts and/or in absence of transformation, and/or the updates of the pose-blend shape information are indicative of a number of pose-blend shapes indicated by the pose-blend shape information.

According to an embodiment, the data stream signals a number of vertices of the mesh. The device for generating the data stream might be configured to provide the data stream with the number of vertices of the mesh and the device for evaluating the data stream might be configured to retrieve from the data stream the number of vertices of the mesh.

According to an embodiment, the data stream comprises further updates of the mesh data and/or transformation information. The device for generating the data stream might be configured to provide the data stream with the updates of the mesh data and/or transformation information and the device for evaluating the data stream might be configured to retrieve from the data stream the updates of the mesh data and/or transformation information.

According to an embodiment, the updates of the pose-blend shape information occur, at least, at further updates at which a number of vertices of the mesh changes.

According to an embodiment, the updates of the pose-blend shape information are synchronized to further updates at which a number of vertices of the mesh changes.

Embodiments of the invention are related to methods, which are based on the same considerations as the above-described devices for generating or evaluating a data stream. The methods can, by the way, be completed with all features and functionalities, which are also described with regard to the devices.

An embodiment is related to a computer program having a program code for performing, when running on a computer, a herein described method.

BRIEF DESCRIPTION OF THE DRAWINGS

Embodiments of the present invention will be detailed subsequently referring to the appended drawings, in which:

FIG. 3 shows an exemplary signaling of a scene with one node with two children,

FIG. 4 shows an exemplary pseudocode for creating a linear combination of joint matrices, FIG. 5 shows an exemplary signaling of an animation using morph targets, FIG. 6 shows an exemplary pseudocode for rendering a vertex position using morph targets, FIG. 8 shows an embodiment of pseudocode for computing a joint matrix, FIG. 9 shows an embodiment of pseudocode for defining at least a part of mesh data, FIG. 10 shows a further embodiment of pseudocode for defining at least a part of mesh data, FIG. 15 shows an embodiment of pseudocode for applying a pose blend shape, FIG. 16 shows a further embodiment of pseudocode for applying a pose blend shape, FIG. 17 shows an embodiment of pseudocode defining at least a part of pose-blend shape information, FIG. 18 shows an embodiment of pseudocode for providing weight for a predetermined pose of a pose-blend shape, FIG. 19 shows an embodiment of pseudocode for a pose update, FIG. 24 shows an embodiment of pseudocode for evaluation information, FIG. 25 shows an embodiment of pseudocode for providing a second mesh together with correspondence information, FIG. 26 shows an embodiment of pseudocode for providing several meshes together with correspondence information, FIG. 27 shows an excerpt of a possible definition table for correspondence, according to an embodiment, FIG. 28 shows an alternative excerpt of a possible definition table for correspondence, according to an embodiment, FIG. 29 shows an embodiment of pseudocode related to a non-indexed geometry, FIG. 30 shows a further excerpt of a possible definition table for correspondence, according to an embodiment, FIG. 31 shows an even further excerpt of a possible definition table for correspondence, according to an embodiment, FIG. 32 shows an embodiment of pseudocode related to a number, format and length of correspondence values, FIG. 33 shows an embodiment of pseudocode for defining at least a part of the correspondence information, FIG. 34 shows a further embodiment of pseudocode for defining at least a part of the correspondence information, FIG. 35 shows an even further embodiment of pseudocode for defining at least a part of the correspondence information, FIG. 36 shows an embodiment of pseudocode related to timed accessors, FIG. 37 shows an embodiment of pseudocode for defining transformation information for a first mesh, FIG. 38 shows a further embodiment of pseudocode for defining transformation information for a first mesh, FIG. 39 shows an even further embodiment of pseudocode for defining transformation information for a first mesh, FIG. 40 shows an embodiment of pseudocode for synchronization between different transformations.

DETAILED DESCRIPTION OF THE INVENTION

Figure 1:
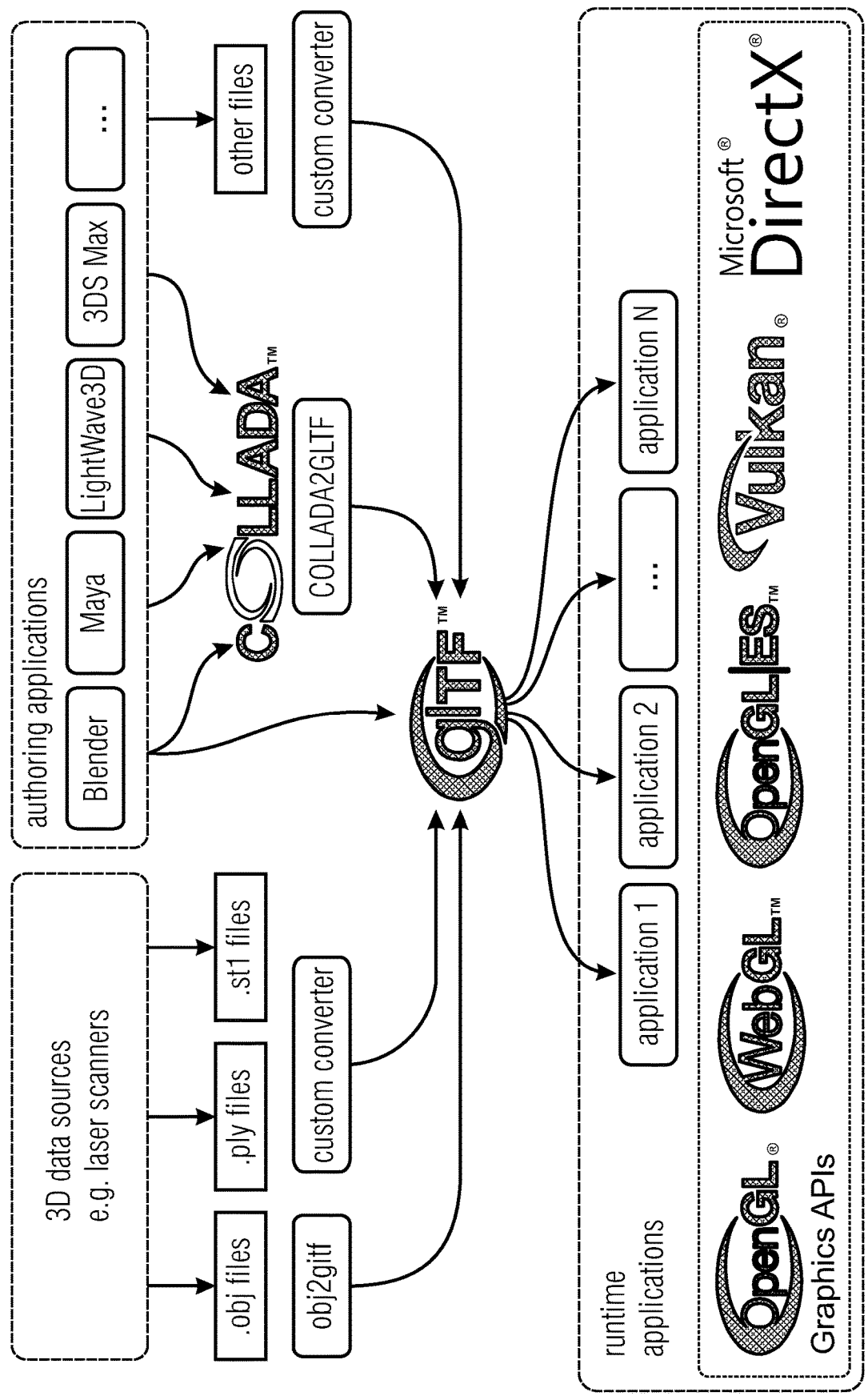
FIG. 1 shows an overview over graphics APIs.

In the following, examples of the present disclosure will be described in detail using the accompanying descriptions. In the following description, many details are described in order to provide a more thorough explanation of examples of the disclosure. However, it will be apparent to those skilled in the art that other examples can be implemented without these specific details. Features of the different examples described can be combined with one another, unless features of a corresponding combination are mutually exclusive or such a combination is expressly excluded.

It should be pointed out that the same or similar elements or elements that have the same functionality can be provided with the same or similar reference symbols or are designated identically, with a repeated description of elements that are provided with the same or similar reference symbols or the same are typically omitted. Descriptions of elements that have the same or similar reference symbols or are labeled the same are interchangeable.

1. Basic Concepts

Compression of 3D content has drawn some attention lately. An example thereof is the Draco, an open source library for compressing and decompressing 3D geometric meshes and point clouds. In addition, there is currently some standardization work ongoing in MPEG to specify solutions for point cloud compression and mesh compression. When such solutions are widely deployed and achieve a reasonable compression efficiency and complexity, transmission of dynamic 3D geometric objects, i.e. a sequence of a moving 3D geometric object will be feasible.

Mesh animations have been widely used in the past, particularly applied with CGI content. The idea of mesh animations is that an object, or the mesh thereof can be modified/transformed and for instance represent a movement (e. g., a person walking). Different approaches have been used for such animations.

A basic one is based on what is called skinning. The basic principle relies on rigging, which is a procedure in which an object is represented by a surface (mesh-skin) and a hierarchical set of interconnected bones (collectively forming the skeleton or rig). The vertices of the mesh are associated to the bones or joints connecting them and have scaling factors in the form of a skinning matrix (vertex weights for each bone or joint) that describe to what extent the movement of the mesh/skin near the joints of two bones are influenced by the bones. Thereby, any movement/change in the skeleton (bones placement/orientation) determines the new position of the vertices of the mesh/skin. This is shown in the formula below for linear blend skinning, which is a particular type of skinning. Note that there are more ways of doing skinning, e. g. dual quaternion skinning that produces less artifacts at the cost of a more computational complexity. However, the details of the present application can apply to any type of skinning and formula below is only shown as an example.

$p'_i = \Sigma_j w_{ij} T_j p_i$ where Tj is the transformation of bone j, pi is the original position of vertex i, wij is the weight of vertex i with respect to bone j and p'i is the new position of the skinned vertex i.

Such animations suffer however from severe deformations, e. g. the model deformation does not correspond well to how a similar natural object would typically deform.

An alternative is to do animations based on morph targets. Basically, the idea is to provide the mesh of an object at different position (e. g., postures of the object). Then, the mesh of the object at a different position can be obtained by interpolating in between two or more of these morph targets. The interpolation can be controlled by weights of the mesh. The weights determine how these morph target displacements are added to an initial state of the geometry in order to obtain the current state of geometry.

Generally, the 3D content is contained under a scene structure meaning how the 3D content should be rendered. It is also called a scene description. Sophisticated 3D scenes can be created with authoring tools. These tools allow one to edit the structure of the scene, the light setup, cameras, animations, and, of course, the 3D geometry of the objects that appear in the scene. Applications store this information in their own, custom file formats for storage and export purposes. For example, Blender stores the scenes in .blend files, LightWave3D uses the .lws file format, 3ds Max uses the .max file format, and Maya uses .ma files.

3D data scanners for example LIDAR scanners, also export the 3D assets in propriety format such as .ply. However, such formats do not contain information about the scene structure or how the objects should be rendered. Therefor such 3D assets are imported to an authoring tool so that the 3D assets can be contained in a scene description format.

An important part that is needed for the applications described in the instruction is a scene description. A scene description language is a language used to describe a scene to a 3D renderer, i.e. how objects that collectively form a scene are composed (3D/2D geometry, form, textures, animations) and/or arranged with respect to another. There are several scene description languages.

Khronos started the GL Transmission Format (gITF) to bring a unified solution to fragmented practice of imports and exports for 3D scenes. The solution includes:
  A scene structure described with JSON, which is very compact and can easily be parsed.
  The 3D data of the objects are stored in a form that can be directly used by the common graphics APIs such as OpenGL, WebGL, etc., so there is no overhead for decoding or pre-processing the 3D data.

Figure 2:
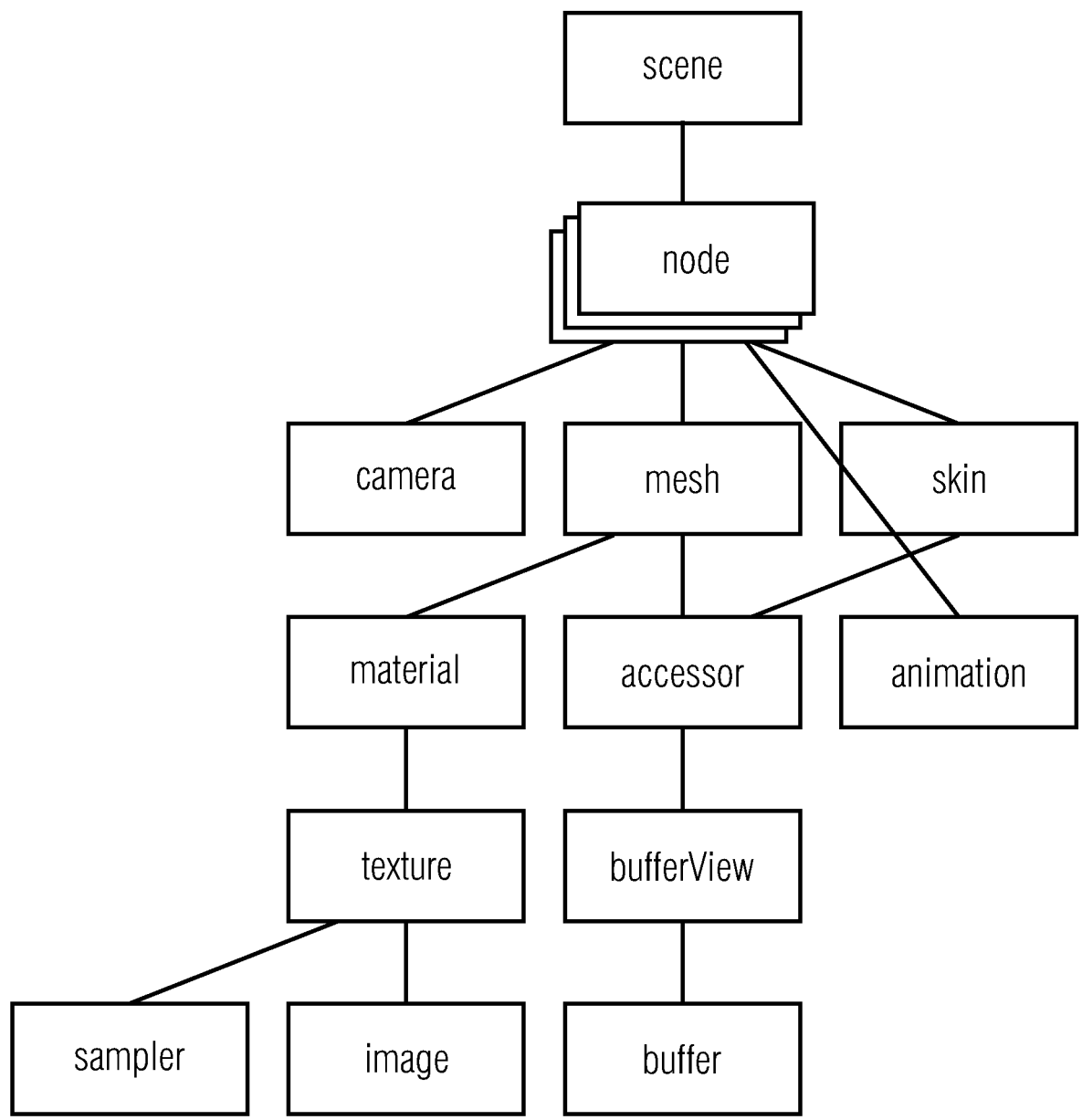
FIG. 2 shows the data structure in glTF.

The description herein will be mainly focusing on gITF but this should be understood as an example, as the embodiments described herein could be similarly integrated in any other scene description format as listed above for example. See also FIG. 1, which shows an overview over graphic APIs (Application Programming Interfaces).

gITF (GL Transmission Format) is a specification for the efficient storage, transmission, loading and rendering of 3D scenes and the contained individual models by applications. gITF is a vendor and runtime-neutral format that can be loaded with minimal processing. gITF is aimed to help bridge the gap between content creation and rendering. gITF is JSON formatted with one or more binary files representing geometry, animations, and other rich data. Binary data is stored in such a way that it can be loaded directly into GPU buffers without additional parsing or other manipulation. The basic hierarchical structure of data in gITF format is shown in FIG. 2. FIG. 2 shows the data structure in gITF.

In gITF, a scene consists of several nodes. Nodes can be independent from each other or following some hierarchical dependence defined in gITF. Nodes can correspond to a camera thus describing projection information for rendering. However, nodes can also correspond to meshes (describing objects) and to skin as well (if skinning allowed). When the node refers to a mesh and to a skin, the skin contains further information about how the mesh is deformed based on the current skeleton pose (e. g. skinning matrixes). In such a case, a node hierarchy is defined to represent the skeleton of an animated character. The meshes may contain multiple mesh primitives, which are the position of the vertices, normal, joints, weights, etc. In gITF, the skin contains a reference to inverse bind matrices (IBM). The matrices transform the geometry into the space of the respective joints.

All data, such as mesh vertices, textures, IBM, etc. are stored in buffers. This information is structured as bufferViews, e. g. one bufferView is described as a subset of a buffer with a given stride, offset and length. An accessor defines the exact type and layout of the data that is stored within a bufferView. gITF links texture, mesh information and further parameters to bufferViews, so that it is clear where the desired information can be found in the data present in the buffer(s).

Material which might include textures to be applied to rendered objects can be also provided. The samplers describe the wrapping and scaling of textures. The mesh provides information with texture coordinates which are used to map textures or subsets of texture to mesh geometry. Finally, gITF supports pre-defined animations using skinning and morph targets.

1.1 Vertex Skinning Animations

An example gITF structure using skinning with one node with two children is shown in FIG. 3.

For skinning, the mesh.primitives contain attributes particularly "JOINTS_0", and "WEIGHTS_0" as highlighted in FIG. 3. The data for mesh.primitives "JOINTS_0" is accessed through accessor 2 as shown in the example highlighted in yellow. The data contains indices of the joints which should have an influence on the vertex during the skinning process. On the other hand, mesh.primitives "WEIGHTS_0" in accessor 3 as shown in the example highlighted in green, provides information about the intensity with which each joint should influence each vertex. Combining the "JOINTS_0" and "WEIGHTS_0" attributes results in exact information about the influence that each joint has on each vertex. An array of joint matrices describes the current pose of the skeleton. In gITF, the skin property contains a reference to inverse bind matrices (IBM). The joint matrices for each joint are calculated using the inverseBindMatrices data in accessor 4 as shown in the example highlighted in yellow. The vertex shader in a client application renderer, uses the combined information to create a linear combination of the joint matrices as shown in the pseudocode of FIG. 4.

In order to perform vertex skinning animations, the joint nodes are transformed. The animation property includes different sets of animations. Each animation entry contains a list of channel and corresponding samplers. For example, as yellow highlighted in the example shown in FIG. 3 under animations. The samplers array contains animation.sampler objects that define how the values that are provided by the accessors have to be interpolated between the key frame. The animation.sampler.input refers to an accessor which provides the key frame time intervals and animation.sampler.outputs refers to an accessors which provides the key frame transformation data for a node (in this case a joint).

The animations contain an array of animation.channel objects. The channels establish the connection between the input, which is the value that is computed from the sampler, and the output, which is the animated node property. Therefore, each channel refers to one sampler, using the index of the sampler, and contains an animation.channel.target. The animation.channel.target refers to a node, using the index of the node, and contains a path that defines the property of the node that should be animated. The value from the sampler will be written into this property. In the example shown in FIG. 3 as highlighted in yellow, the node property "rotation" of node at node index 2 is animated with "LINEAR" interpolation using the key frame information from sampler at sampler.index 0.

The above example only covers LINEAR interpolation. Animations in a gITF asset can use three interpolation modes:
STEP
LINEAR
CUBICSPLINE 1.2 Morph Target Animation The animation consists of a sampler with an input which corresponds to an internal time for the animation provided by accessor 5 and rotation values for joint (in Node 2) provided by accessor 6 as output of the sampler. The rotation values for the joint (in Node 2) are interpolated with a 'LINEAR' function over the animation duration.

An example using morph targets is shown in FIG. 5.

In this second approach, there is no concept of a skeleton, joints and bones, but a mesh is provided with vertices positions described in accessor 1. Then, two morph targets are defined by accessor 2 and accessor 3, i.e. displacements or differences for certain mesh attributes (in this case vertex positions). In the example, there are two morph targets, both mapping the "POSITION" (yellow highlighted) attribute to accessors that contain the morphed vertex positions. The mesh also contains an array of weights (yellow highlighted) that defines the contribution of each morph target to the final, rendered mesh.

The weights of the mesh determine how these morph target displacements are added to the initial geometry in order to obtain the current state of the geometry. The pseudocode for computing the rendered vertex positions for a mesh primitive is shown in FIG. 6.

The rendered animation as shown in the example result will be the interpolation applied to the different morph targets (in this case "LINEAR"). Similar as in vertex skinning animation, an animation here contains a sampler with an input which corresponds to the key frame time intervals for the animation provided by accessor 4. However, in morph target animations the output contains key frame weight transformation data for the animations in the accessor 5 as highlighted in yellow. The weight values for the node at node.index 0 are interpolated with a 'LINEAR' function over the animation duration.

2. Limitations of gITF for Volumetric Video gITF does not provide means to update the topology of an object (e. g. how many points represent the mesh of an object). A captured volumetric scan is processed to generate a texture material and 3D mesh geometry. In realistic scenarios, the number of vertices representing the object varies typically. At the same time, the volumetric scan lacks information on semantical information like skin and morph targets for animations, etc. Some of the solutions that have being considered are difficult to be used in practice as the amount of information to allow animation would involve transmitting a lot of data.

3. Solution

There could be three different approaches to enable animation for a volumetric video:

1. Rig the volumetric video scan at the source and stream the skinning matrix (see example for skinning above)
   a. Upside:
      i. no additional data and semantics introduction in gLTF (needed for solution 3)
   b. Downside:
      i. pure skinning implementation; this would lead to skinning-specific artefacts such as candy wrapper
      ii. video scan (object mesh) and corresponding skinning matrixes need to be updated (transmitted) when the topology changes.
2. Rig the volumetric video at the source and stream the skinning matrix along with pose blend shapes (morph targets) (see examples for skinning and morph target in above—this is a combination of both)
   a. Upside:
      i. no additional data and semantics introduction in gLTF (needed for solution 3)
      ii. Uses pose-blend shapes to improve the skinning results
   b. Downside:
      i. pose-blend shapes and skinning matrixes need to be updated (transmitted) when the number of vertices for the scan changes
3. Use a model with constant topology for the volumetric video scan
   a. Upside:
      i. Using a model with static topology as the basis for the animation: number of vertices and skinning matrixes do not change over time
      ii. Reduce skinning artefacts by using advanced models that e,g, make use of pose-blend shapes (morphing the model mesh)
      iii. Full control on the presentation engine to pose-adapt the volumetric video scan
   b. Downside:
      i. a vertex correspondence data and semantic information has to be introduced that maps the changing mesh topology to the model mesh
      ii. the model (including e. g. pose-blend shapes) has to be transferred to the presentation engine, the engine needs to compute the advanced model The solutions as laid out above are fully described in this document as follows:

Chapter "Self-rigged volumetric scan" describes solution 1 as described above, chapter "Self-rigged volumetric scan with pose-dependent improvements" describes solution 2 as described above, and chapter "Introduction to vertex correspondence" describes solution 3 as described above.

3.1 Self-Rigged Volumetric Scan

Figure 7:
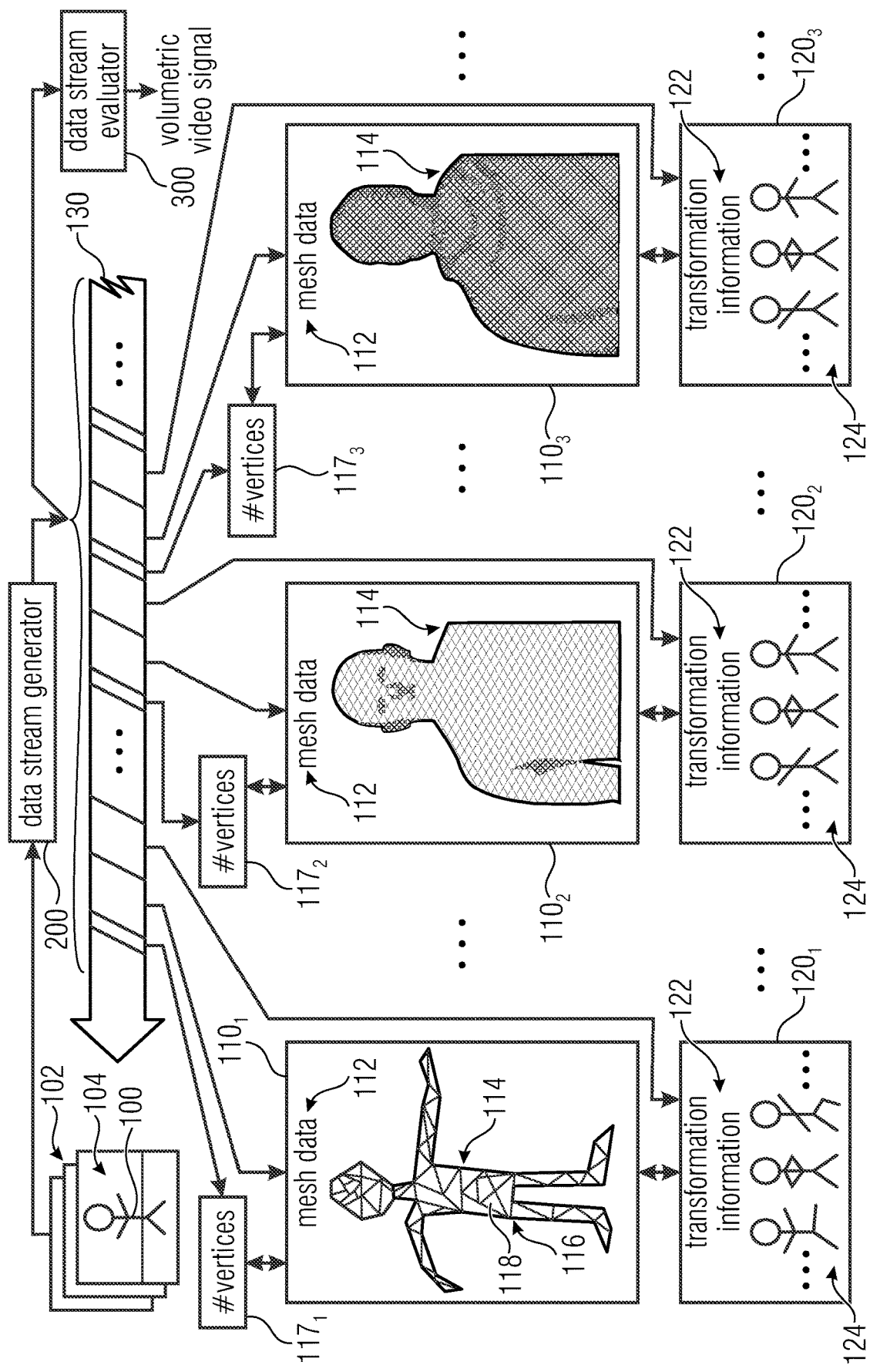
FIG. 7 shows an embodiment related to updates of mesh data and transformation information.

According to an embodiment, shown in FIG. 7, it is possible to represent an object 100 with changing topology over time in a volumetric video 102 by providing updates $110_2$ and $110_3$ of mesh data 112 together with updates $120_2$ and $120_3$ of transformation information 122.

The mesh data 112 describes an object 100 with a first mesh 114. The mesh data 112 might comprise positions of vertices 116 of the first mesh 114 and optionally normals associated with the vertices 116 or faces 118 of the first mesh 114, weights associated with the vertices 116, and optionally skeleton information, wherein the skeleton information might comprise positions of joints and bones of the object 100 in a three dimensional space or relative to the first mesh 114 and wherein the weights indicate how strong a transformation applied to a joint or a bone should influence a vertex 116 of the first mesh 114. The first mesh 114, for example, is defined by vertices 116 and faces 118, wherein a set of at least three vertices 116 define a face 118. Therefore, the mesh data 112 might comprise, for each vertex 116 of the first mesh 114, an information of a position of the respective vertex 116 in a three dimensional space, wherein the respective vertex with its position might be identifiable in the mesh data 112 by a pointer, e. g. an index.

The transformation information 122 provides information, like skinning information, for a transformation of the first mesh 114 so as to describe different poses 124 of the object 100. The transformation information 122, for example, comprises one or more of skeleton data comprising bones data, joint data, and/or weight data for skinning, e. g. the bones data and/or joint data in terms of positions and/or orientations of the bones and/or joints of the object 100. The weight data might indicate how strong the transformation applied to a joint or a bone should influence a vertex 116 of the first mesh 114. Optionally, the weight data is comprised by the first mesh data, e.g. as a property of the vertices of the plurality of vertices of the first mesh. The transformation information, for example, indicates a movement/change in the skeleton data, e.g. a transformation of the joints and/or bones, and the weights are applied correspondingly, which results in a new position of a set of vertices of the first mesh 114 dependent on the weight data. Optionally, the transformation information 122 comprises one or more morph targets, wherein a morph target, for example, defines for a set of vertices variations of the first mesh 114, i.e. a base mesh, in terms of a change of positions of two or more vertices of the set of vertices. According to an embodiment, the transformation information 122 comprises both, the skeleton data and one or more morph targets, wherein the one or more morph target and the skeleton data are updated at different update rates.

For each update $110_2$ and $110_3$, the mesh data 112 describes the object 100 with the first mesh 114 at a predetermined pose, e. g. a neutral pose like the T-pose. Each update $110_2$ and $110_3$ of mesh data 112, for example, is associated with an update $120_2$ and $120_3$ of transformation information 122. With the transformation indicated by the respective updated transformation information 122 the first mesh 114 is transformable, e. g. from the predetermined pose, towards the different poses 124.

It is to be noted that the updates $120_2$ and $120_3$ of the transformation information 122 might indicate mesh specific transformations, i.e. transformations for the first mesh 114 indicated by the mesh data 112 of the corresponding update $110_2$ or $110_3$, but the different poses described by the first mesh 114 transformed by the mesh specific transformations might be the same for different updates $120_2$ and $120_3$.

FIG. 7 shows an embodiment for a scene 104 with one object 100. However, it is clear that also scenes 104 with two or more objects 100 can be represented. In case of a scene 104 with two or more objects 100, for each of the two or more objects 100, updates $110_2$ and $110_3$ of mesh data 112 and updates $120_2$ and $120_3$ of transformation information 122 might be provided. Alternatively, it is also possible that the updates $110_2$ and $110_3$ of mesh data 112 and updates $120_2$ and $120_3$ of transformation information 122 are only provided for one or more objects 100 of the two or more objects 100.

A data stream 130 might represent a scene 104 comprising an object 100, wherein the data stream 130 comprises for the object 100 the updates $110_2$ and $110_3$ of the mesh data 112 and the updates $120_2$ and $120_3$ of the transformation information 122. Volumetric video data is encoded into the data stream 130 in a scene description language.

A device 200, e. g. a data stream generator, might be configured to generate the data stream 130 by providing in a scene description language information with regard to the one or more objects 100 in the data stream 130. A device 300, e. g. a data stream evaluator, might be configured to evaluate the data stream 130 by retrieving from the data stream 130 the information with regard to the one or more objects 100. The information with regard to the one or more objects 100 comprises the updates $110_2$ and $110_3$ of mesh data and the updates $120_2$ and $120_3$ of transformation information as described above. Optionally, the information with regard to the one or more objects 100 might comprises one or more of the features described in the following.

As shown in FIG. 7, the data stream 130 might comprise information with regard to original mesh data $110_1$ and original transformation information 120 and updates therefrom $110_2$, $110_3$, $110_2$ and $110_3$. According to an embodiment, at each update, mesh data 112 and transformation information 122 is updated.

The data stream 130 might signal a number 117 (see $117_1$ to $117_3$) of vertices 116 of the mesh 112. As shown in FIG. 7, the number 117 of vertices 116 might be signaled together with each mesh data 112. However, it is also possible that the number 117 of vertices 116 is only signaled together with some updates $110_2$ and $110_3$ of the mesh data 112. The data stream 130, for example, comprises configuration information which indicates whether the number 117 of vertices 116 remains constant or changes dynamically, wherein, if the number 117 of vertices 116 changes dynamically, the data stream 130 signals the number 117 of vertices 116 of the first mesh 114 at each update $110_2$ and $110_3$. According to an embodiment, the transformation information 122 is updated at updates $110_2$ and $110_3$ at which the number 117 of vertices 116 of the first mesh 114 changes, while the transformation information 122 remains constant and left un-updated at updates at which the number 117 of vertices 116 does not change, e. g. in comparison to the number 117 of the vertices 116 of the first mesh 114 indicated by the previous update.

The first mesh 114 indicated by an update $110_2$ or $110_3$ of the mesh data 112 might be a mesh resulting from a volumetric scan of the object 100.

Skeleton-based skinning, or vertex skinning is supported out of the box by gITF2.0. A volumetric scan, e. g. the mesh data 112, typically using formats like .ply for a point cloud capture or .obj for a mesh-based geometry can be imported to a content authoring tool such as Blender, etc. Using the authoring tool, a computer graphic artist is allowed to manual rig the volumetric scan i.e., provide skeleton information, apply appropriate weights for the mesh vertices 116 of the volumetric scan or sophisticated tools like Mixamo Auto Rigger, Auto Riggin addons from Blender. can be applied to rig the volumetric scan which minimize the human efforts to rig the volumetric scan. In such a case, the authoring tool exports out the rigged volumetric scan asset, e. g. as the mesh data 112, in a scene description format for example gITF. The mesh.primitives, e. g. information comprised by the mesh data 112, comprise the vertex information for the volumetric scan as well as "JOINTS_0" and "WEIGHTS_0" to allow a client runtime application, e. g. the device 300, to animate the volumetric scan and render it. For simplicity and efficiency, the indices of joint node contained in the "JOINTS_0" and "WEIGHTS_0" attributes are usually a 4D vectors, limiting the number of joints that may influence a vertex 116 to 4. If four more joints influence a vertex 116, additional attributes "JOINTS_1" and "WEIGHTS_1" will be present in the gITF file making the total joint influencing a vertex 116 to 8. Similar can be done to apply 12 joint, 16 joint (multiple of 4) influence to a vertex 116.

The skin property, e. g. information comprised by the mesh data 112, in gITF is the core of vertex skinning. It includes attributes;

1. an array called joints, which lists the indices of the nodes that define the skeleton hierarchy. The joint hierarchy used for controlling skinned mesh pose is simply the gITF node hierarchy, with each node designated as a joint.
2. a reference to an accessor in the property inverseBindMatrices. This accessor provides one matrix for each joint. Each of these matrices transforms the geometry into the space of the respective joint. This means that each matrix is the inverse of the global transform of the respective joint, in its initial configuration. However, the skin.inverserBindMatrix attribute is not mandatory.

The inverse bind matrix is used to compute a joint matrix for each joint so that it can be plugged into the vertex shader code for skinning matrix of a vertex 116 as shown above. The pseudocode for computing the joint matrix of joint j may look as shown in FIG. 8.

Dynamic Update

For a timed sequence of volumetric scan i.e. a volumetric video, the number 117 of vertices 116 for the volumetric mesh, i.e. the first mesh 114, may change during the course of timed sequence which means the mesh.primivities.POSITION, i.e. the positions of the vertices 116 of the first mesh 114, might change. Therefore, the attributes "JOINTS_*" and "WEIGHTS_*" should also be updated dynamically. This means that the accessors referred by "JOINTS_0" and "WEIGHTS_0" will be dynamically updated. At the same time, since the topology of the volumetric scan, for example, changes over the time, this leads to dynamically update the skin.inverseBindMatrix for each joint as well.

The SkinPrimitivesConfigBox ('scob'), which might be comprised by the mesh data 112, stores the array of joints and their corresponding weights for each vertex 116 which have influence over the vertex 116. Also the mesh index is stored in the config box which determines the mesh.index for which the skin primitives are described, e. g. the first mesh 114 indicated by the mesh data, see $110_1$ to $110_3$, might be identifiable by a pointer like an index. According to an embodiment, the main information that is needed to be provided is the number of joints that belong to the skeleton and the maximum number of joints that affect a vertex 116. The later can be provided for instance in multiple of 4 as "joint_sets_minus1", where e. g., 0 means at most 4 joints can affect the position of a vertex 116 and 1 means 8 and so on. The number_of_joints indicates the actual number of joints that are attached to a particular mesh 114. The number 117 of vertices 116 of the mesh 114 might be indicated in the configuration if it is constant for the whole time. This is indicated by a dynamic_flag. If dynamic is equal to 0 the values static_num_vertices is provided in the configuration. Otherwise, it is updated at each sample. See also FIG. 9.

The samples, for example, are provided in tracks, which store the actual skin primitives data for each vertex 116. The SkinPrimitiveSample, which might be comprised by the mesh data 112, provides the primitives "JOINTS_*" and "WEIGHTS_*" for a mesh 114. To be consistent with gITF formats, the number of joints for each vertex 116 and their corresponding weights, for example, are stored as a set of 4D vectors, although this could be configured otherwise (e. g., providing the number per set in the configuration above). For each vertex 116 and each set of joints the values of which joints affect a vertex 116 and to what extent (weight) are provided by joints [i][j] and weights [i][j]. See also FIG. 10.

Summarizing, in this embodiment frames are provided that update $120_2$ and $120_3$ the skinning information/weights that allow skinning to be applied to the mesh 114. The information of the updates may contain indication of whether the number 117 of vertices 116 and therefore the number of skinning information (joints affecting and weights) are static or dynamic. If dynamic, each frame indicates how many values of such information are provided. Also, the information provides the sizes of set of joints that affect vertices 116 (size of the set) and then a number of sets (joints_set_minus1) is provided to indicate the maximum number of weight values per vertex 116 that are indicated.

In another embodiment only whenever the number of vertices 116 changes for the mesh 114 an update is provided synchronously on the skinning information (joints affecting and weights).

Figure 11:
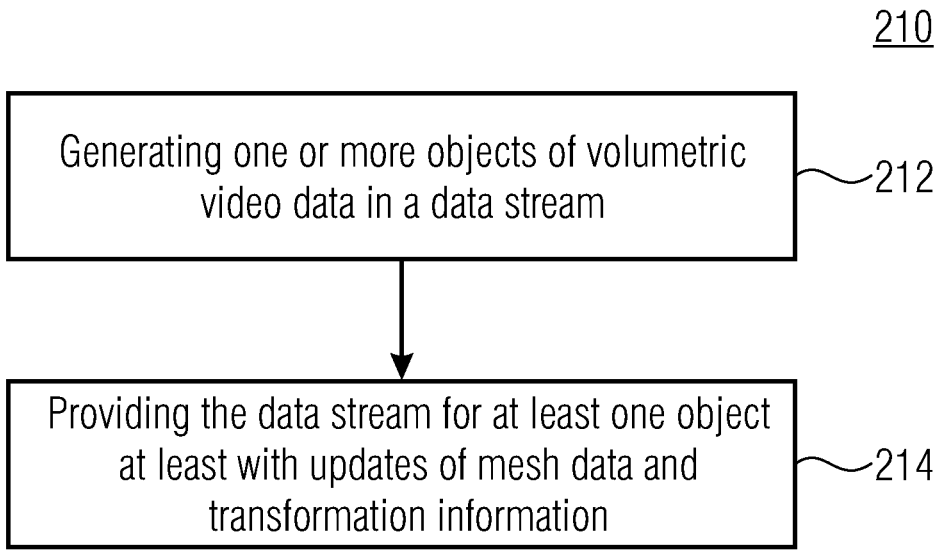
FIG. 11 shows an embodiment of a method configured for providing updates of mesh data and transformation information in a data stream.

An embodiment, as shown in FIG. 11, relates to a method 210 of generating the data stream 130 comprising generating 210 one or more objects 100 of volumetric video data in the data stream 130 in a scene description language, and providing 214 the data stream 130 for at least one object 100 at least with updates $110_2$ and $110_3$ of mesh data 112 and with updates $120_2$ and $120_3$ of transformation information 122. The method 210 can be completed with all features and functionalities, which are also described with regard to the device 200 in FIG. 7.

Figure 12:
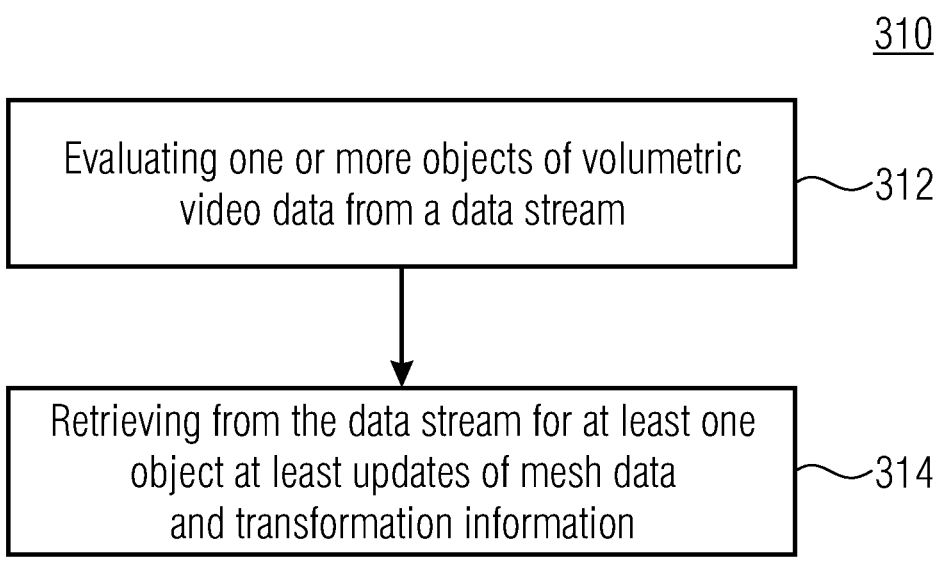
FIG. 12 shows an embodiment of a method configured for retrieving updates of mesh data and transformation information from a data stream.

And an embodiment, as shown in FIG. 12, relates to a method 310 of evaluating the data stream 130 comprising evaluating 312 one or more objects 100 of volumetric video data from the data stream 130 into which the one or more objects 100 are encoded in a scene description language, and retrieving 314 from the data stream 130 for at least one object 100 at least updates $110_2$ and $110_3$ of mesh data 112 and updates $120_2$ and $120_3$ of transformation information 122. The method 310 can be completed with all features and functionalities, which are also described with regard to the device 300 in FIG. 7.

3.2 Self-Rigged Volumetric Scan with Pose-Dependent Improvements

Figure 13:
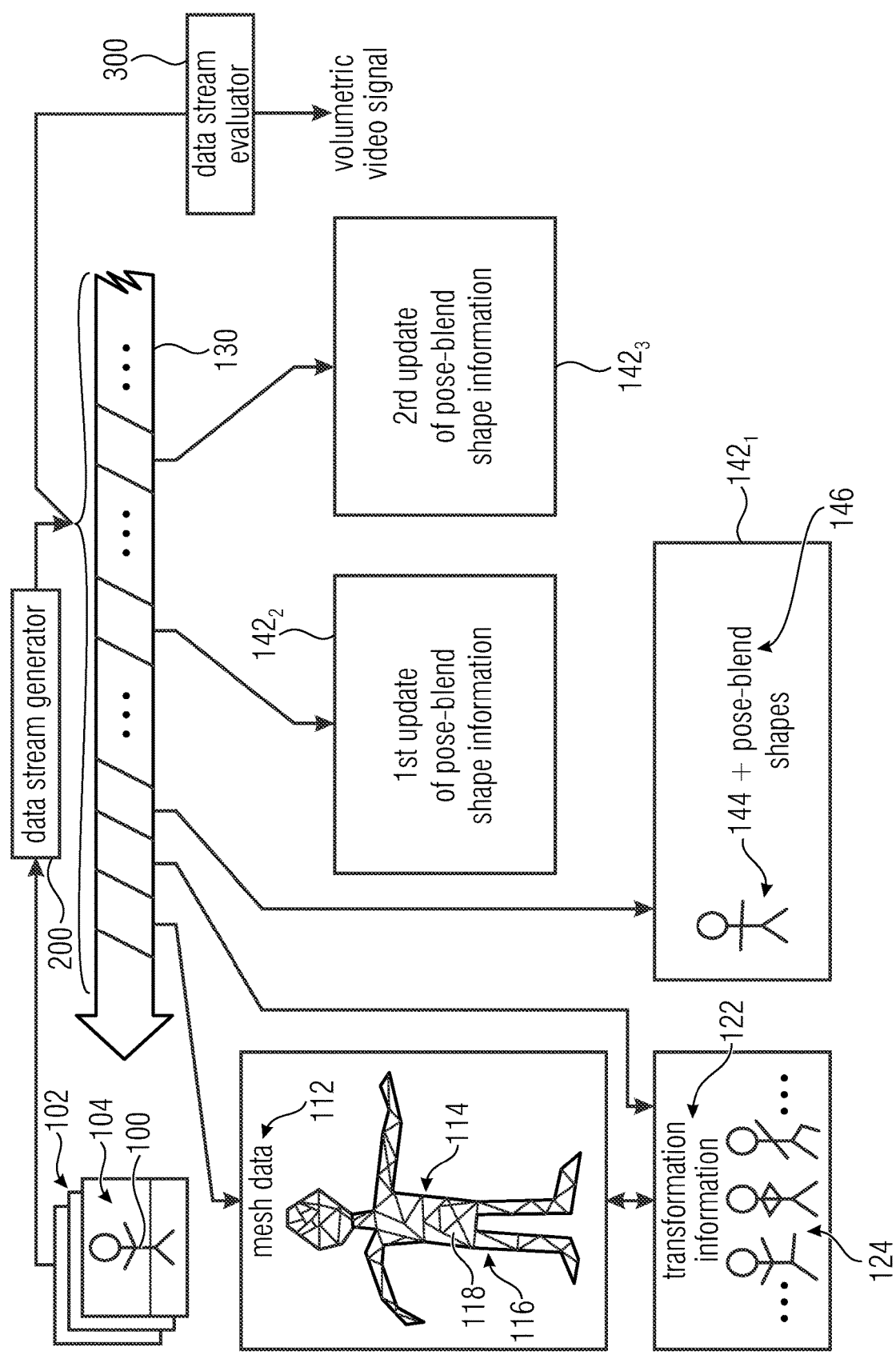
FIG. 13 shows an embodiment related to updates of pose-blend shapes.

According to an embodiment, shown in FIG. 13, it is possible to represent an object 100 with changing topology over time in a volumetric video 102 by providing updates $142_1$ and $142_2$ of of pose-blend shape information $142_1$, e. g. morph target information.

FIG. 13 shows a data stream 130 having volumetric video data encoded therein in a scene description language. The data stream 130 represents a scene 104 comprising one or more objects 100.

The data stream 130 comprises for at least one object 100 mesh data 112 which describes the at least one object 100 with a first mesh 114, and transformation information 122 for a transformation of the first mesh 114 so as to describe different poses 124 of the at least one object 100. The mesh data 112 and the transformation information 122 might comprise features as described with regard to the mesh data 112 and the transformation information 122 in FIG. 7. Optionally, the data stream 130 in FIG. 13 might additionally comprise updates of mesh data and transformation information as described with regard to FIG. 13.

The pose-blend shape information $142_1$ and/or the updates $142_2$ and $142_3$ of the pose-blend shape information $142_1$, for example, is/are indicative of a default pose 144 to be adopted at rendering starts and/or in absence of transformation, like the T-pose or any other neutral pose. The pose-blend shape information $142_1$ and/or the updates $142_2$ and $142_3$ of the pose-blend shape information $142_1$, for example, are indicative of a number of pose-blend shapes 146.

Figure 14A:
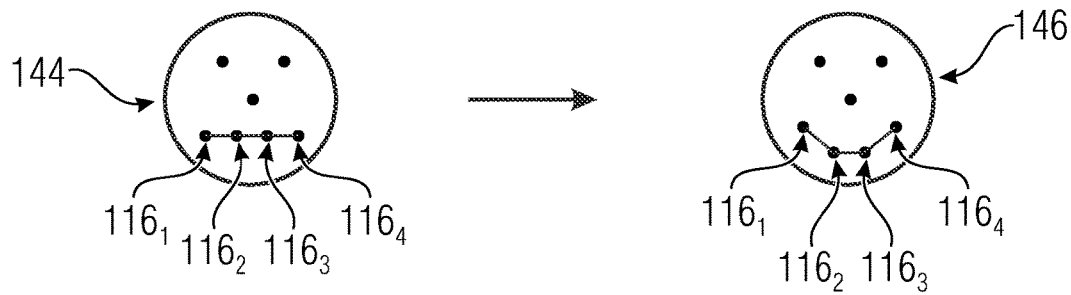
FIG. 14a shows an example of a pose-blend shape for a smiling mouth.
Figure 14B:
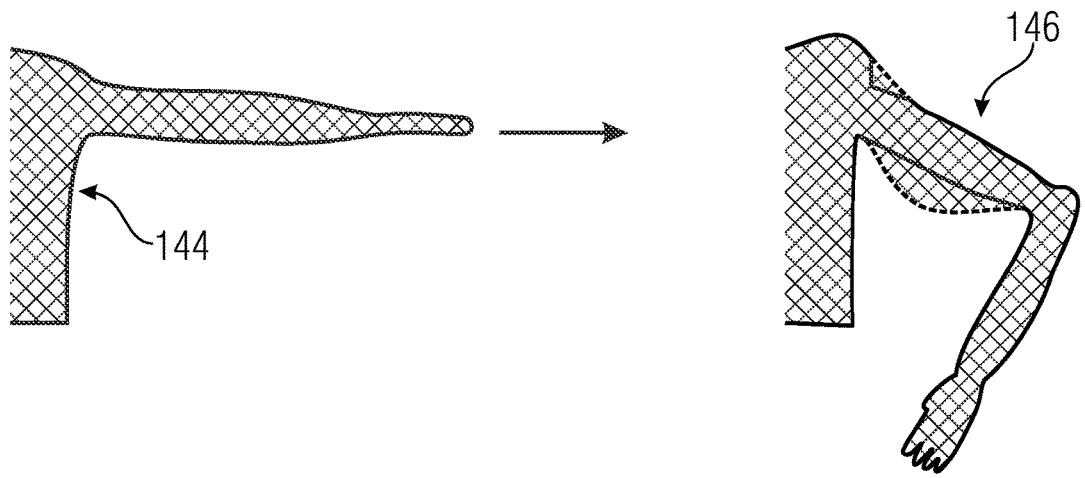
FIG. 14b shows an example of a pose-blend shape for forming a bicep to a bulge.
Figure 14C:
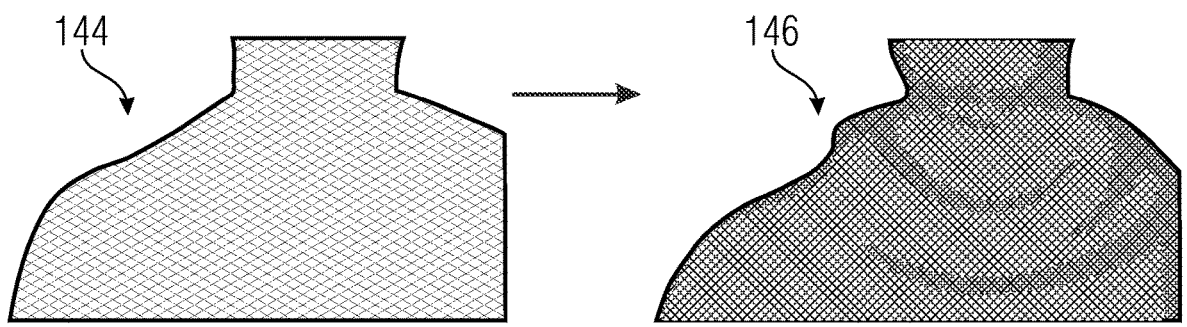
FIG. 14c shows an example of a pose-blend shape for providing a scarf to an object.

FIGS. 14a to 14b show examples for pose-blend shapes 146. The default pose 144 is indicated on the left side of the figures and the pose-blend shape 146 is indicated on the right side of the figures. The pose-blend shape 146 indicated in FIG. 14a is indicative of a transformation of a set of vertices $116_1$ to $116_4$ of the first mesh 114 so that a mouth of the object 100 is transformed into a smile. The pose-blend shape 146 indicated in FIG. 14b is indicative of a transformation of a set of vertices of the first mesh 114 so that a bicep of the object 100 is forming a bulge at a bending of an arm of the object 100. The pose-blend shape 146 corrects deformations that do not correspond well to how a similar natural object would typically deform at a bending of the arm. The pose-blend shape 146 indicated in FIG. 14c is indicative of a transformation of a set of vertices of the first mesh 114 so that the object 100 is wearing a scarf around its neck.

The pose blend shapes 146, for example, are configured to correct unnatural deformations of the first mesh 114 at an application of a transformation onto the first mesh 114 or refine the first mesh 114, e. g. so that the surface of the first mesh 114, i.e. the skin, of the object is adopted, e. g. so that it looks more natural.

According to an embodiment, the data stream 130 signals a number of vertices 116 of the first mesh 114.

As already indicated above, the data stream 130 might comprise updates $110_2$ and $110_3$ of the mesh data 112, wherein the number of the vertices 116 of the first mesh 114 might be not change or might change at the updates $110_2$ and $110_3$. According to an embodiment, the updates $142_2$ and $142_3$ of the pose-blend shape information $142_1$ occur, at least, for cases at which the number of vertices 116 of the first mesh 114 changes. According to an embodiment, the updates $142_2$ and $142_3$ of the pose-blend shape information $142_1$ are synchronized to the updates $110_2$ and $110_3$ of the mesh data 112 at which the number of vertices 116 of the first mesh 114 changes.

A device 200, e. g. a data stream generator, might be configured to generate the data stream 130 by providing in a scene description language information with regard to the one or more objects 100 in the data stream 130. A device 300, e. g. a data stream evaluator, might be configured to evaluate the data stream 130 by retrieving from the data stream 130 the information with regard to the one or more objects 100. The information with regard to the one or more objects 100 comprises the mesh data 112, optionally updates $110_2$ and $110_3$ of the mesh data 112, transformation information 122, optionally updates $120_2$ and $120_3$ of the transformation information 122 and updates $142_2$ and $142_3$ of the pose-blend shape information $142_1$, as described above.

Similar to the section 'Self-rigged volumetric scan' the volumetric scan, e. g. described by the mesh data 112, will be rigged to facilitate it with a skeleton, and corresponding weights, etc. Along with that the skeleton, a pose-dependent blend shapes/pose blend shapes, i.e. the pose-blend shape information 142 (see $142_1$ to $142_3$), is to be associated with the volumetric scan. The pose blend shapes 146 are used to improves the skinning results and are aimed to eliminate skinning artefacts such as candy wrapper effects, etc.

Usually, the basic idea behind pose-dependent blend shapes, i.e. the pose blend shapes 146, is to morph the 3D mesh, i.e. the first mesh 114, before skinning, such that the results of skinning are improved. The pose-dependent blend shapes can be generated by a computer graphic artists or data-driven methods. The pose blend shapes in gITF are expressed as morph targets, e.g. target position of a set of vertices 116.

In such a case, the pose blend shapes 146 can be applied to a volumetric scan using a morph target, e.g. the target positions of the set of vertices 116, as highlighted in yellow in FIG. 15.

Note: the pose-dependent blend shapes can be applied 100% to morph the mesh geometry using a constant value of weights=1.0.

The pose-blend shape(s) 146 applied rigged-volumetric scan thus can be skinned using typically skinning vertex shader implementations with morphed vertex (highlighted in yellow) as shown in FIG. 16.

Note: pose blend shapes 146 are strongly tied to the style of skinning implementation. This means a pose blend shape 164 strongly tied to a Linear Blend Skinning implementation might not work with a different style of skinning such as Dual Quaternion Blend Skinning. Therefore, for example, it might be needed to indicate this information to the presentation engine through gITF file.

Dynamic Update

The dynamic updates as mentioned above are also applicable for this methodology. In addition to that, the pose blend shapes 146 are to be timely provided.

The PoseMorphTargetConfigBox ('pmtb'), e. g. the pose-blend shape information 142 (see $142_1$ to $142_3$), stores the pose-dependent morph targets, e. g. the pose-blend shapes 146, for the first mesh 114. The mesh index, for example, is stored in the config box which determines the mesh.index for which the pose-dependent morph target is described. The intensity of the morphing can be controlled by weights. For this there is information added to indicate which is the default pose 144 that should be rendered in the absence of user input (i.e. no interactivity). However, the default for the weight is 1.0. See FIG. 17.

The number of vertices 116 and morph targets, e. g. the pose-blend shapes 146, is provided to indicate the morph targets in the samples described in FIG. 17.

The Pose morph target samples, e. g. the pose-blend shape information 142, are provided in tracks which stores the pose-dependent blend shape, e. g. the pose-blend shapes 146, for the first mesh 114. The PoseMorphTargetSample provides the target mesh geometry, e. g. the pose-blend shapes 146, which is used by mesh.target property to morph the first mesh 114. See FIG. 18.

In addition to the weights provided for the default pose 144 the morph_targets, e. g. the pose-blend shapes 146, are provided in FIG. 18. In the example shown they are provided as absolute positions but another option is to provide them as deltas to another pose-blend shape 146 (or, e. g., relative to the default pose 144, i.e. a relaxed position).

An alternative that needs to be considered is the case where the number 117 of vertices 116 or morph targets, e. g. the pose-blend shapes 146, is dynamic. In such a case a dynamic flag could be added to the configuration box and the number 117 of vertices 116 or morph targets is included into the samples themselves.

Another alternative would be to have a single morph target per track and thus, each track would describe in a self contained manner a single morph target and the receiver, e. g. the device 300, would need to get multiple of those (difference to the example above is that the number_of_morph_target is not present).

A further alternative would be that the default pose updates, e. g. updates $110_2$ and $110_3$ of the mesh data 112, and morph target updates $142_2$ and $142_3$ are not synchronized, e. g. default pose updates happen much more frequently than the morph target updates and in such a case they would be provided into different boxes. For instance pose update $142_2$ and $142_3$ could be as shown in FIG. 19.

Another example would be to not provide the weights to morph targets but the position of the skeleton and let the client, e. g. the device 300, derive the weights either equally for all vertices 116 or separately for each vertex 116 to be applied to each morph target (defined above) with additional skinning information (as defined above) to be able to do the transformation. The syntax could be as shown later in JointsTransformationSample.

Summarizing, in this embodiment frames are provided that update the pose-blend shapes information $142_1$ on top of skinning information, e. g. the mesh data 112 and the transformation information 122, to be applied to the mesh 114. The information of the updates $142_2$ and $142_3$ may contain indication of a default pose 144 whenever the rendering of the 3D object is started as such a frame or when no interaction/transformation is performed. Such default values consist of a combination of the different pose-blend shapes provided (e. g. a weighted average of those). The additional signalling indicates whether the updates $142_2$ and $142_3$ consist of updated pose-blend shapes due to a change on the number 117 of vertices 116 of the mesh 114 or whether a different amount of pose-blend shapes are added (increased or decreased).

In another embodiment only whenever the number 117 of vertices 116 changes for the mesh 114 an update $110_2$ and $110_3$ is provided synchronously on the pose-blend shapes information $142_2$ and $142_3$ (joints affecting and weights).

Figure 20:
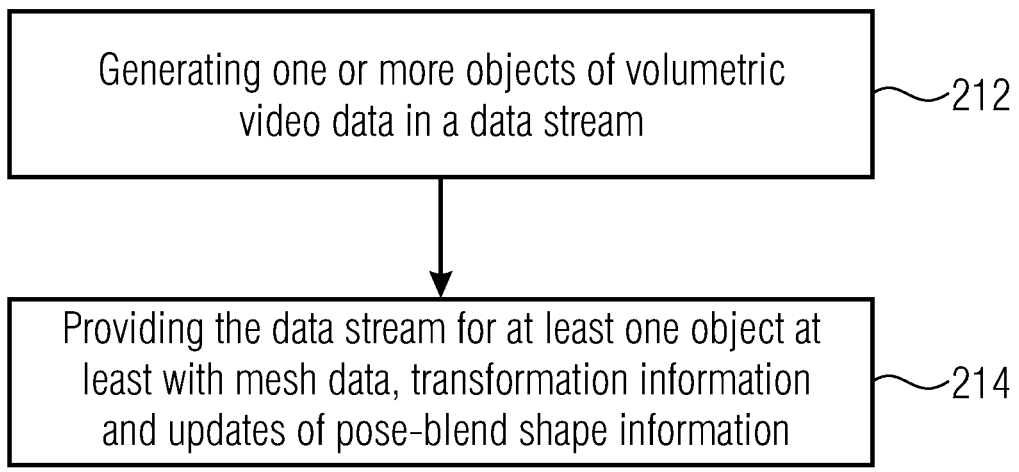
FIG. 20 shows an embodiment of a method configured for providing updates of pose-blend shape information in a data stream.

An embodiment, as shown in FIG. 20, relates to a method 210 of generating the data stream 130 comprising generating 212 one or more objects 100 of volumetric video data in the data stream 130 in a scene description language and providing 214 the data stream 130 for at least one object 100 at least with mesh data 112, transformation information 122 and updates $142_2$ and $142_3$ of pose-blend shape information $142_1$. The method 210 can be completed with all features and functionalities, which are also described with regard to the device 200 in FIG. 13.

Figure 21:
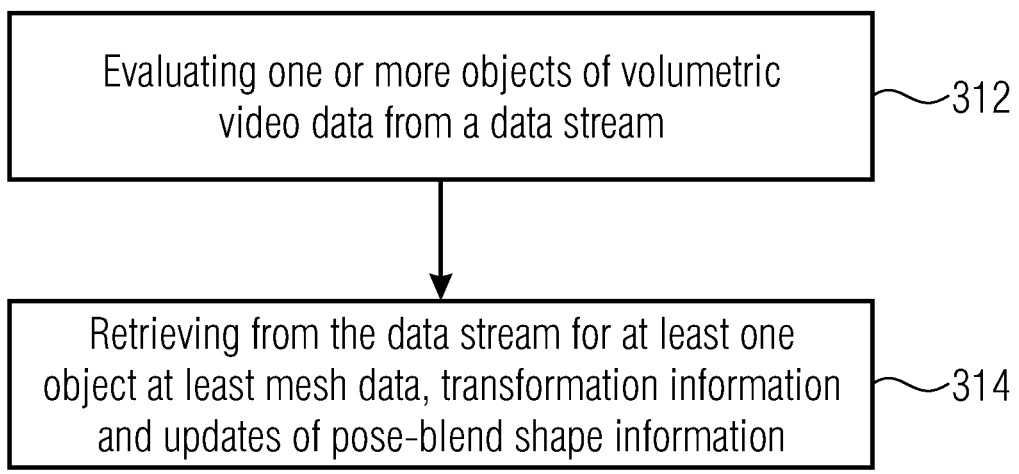
FIG. 21 shows an embodiment of a method configured for retrieving updates of pose-blend shape information from a data stream.

And an embodiment, as shown in FIG. 21, relates to a method 310 of evaluating the data stream 130 comprising evaluating 312 one or more objects 100 of volumetric video data from the data stream 130 into which the one or more objects 100 are encoded in a scene description language, and retrieving 314 from the data stream 130 for at least one object 100 at least mesh data 112, transformation information 122 and updates $142_2$ and $142_3$ of pose-blend shape information $142_1$. The method 310 can be completed with all features and functionalities, which are also described with regard to the device 300 in FIG. 13.

3.3 Introduction to Vertex Correspondence

Figure 22:
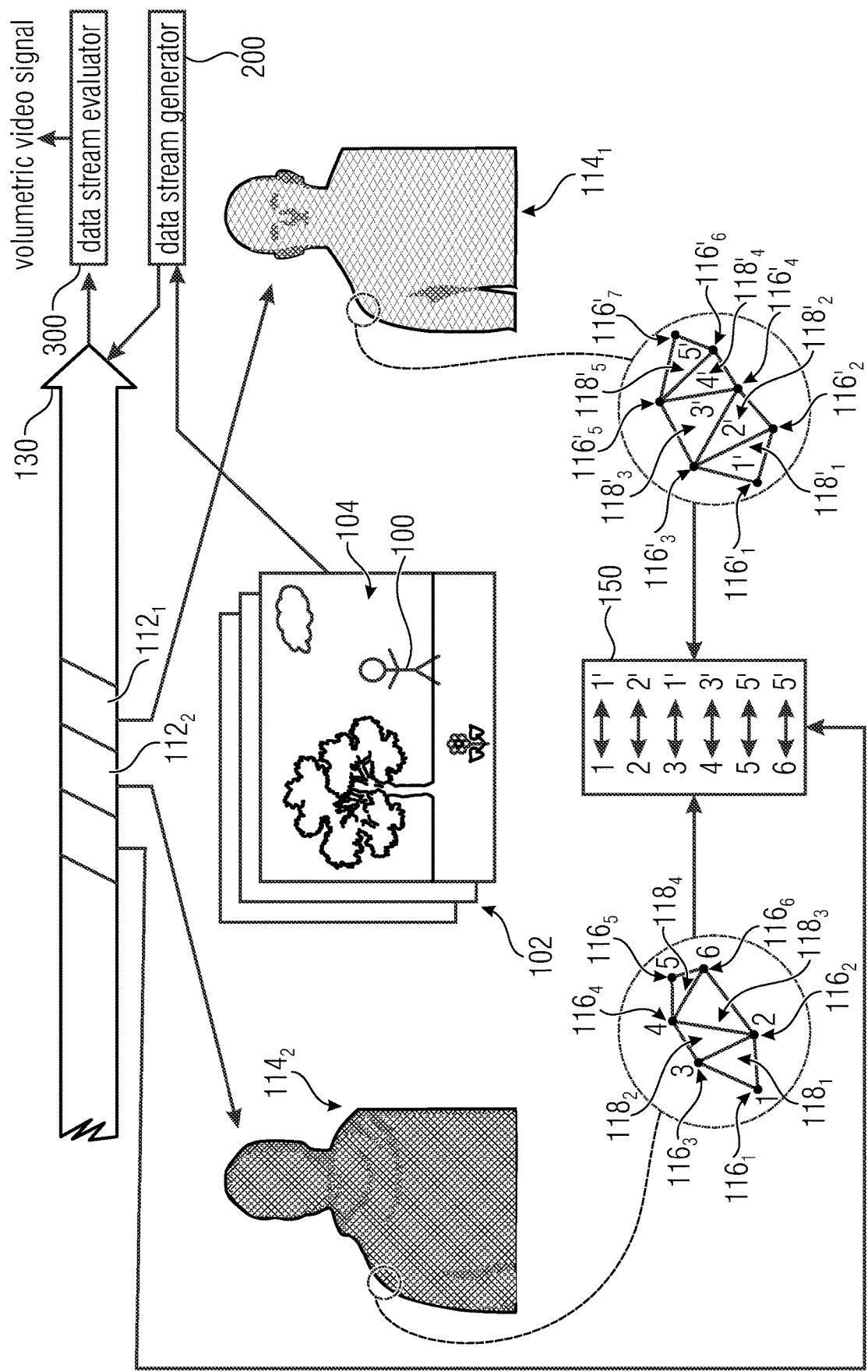
FIG. 22 shows an embodiment related to correspondence information between two meshes.

The embodiment, shown in FIG. 22, relates to a usage or determination of correspondence information 150 between two meshes, e. g. a first mesh $114_1$ and a second mesh $114_2$, to optimize a representation of an object 100 in volumetric video data 102. The correspondence information 150 indicates a mapping between the first $114_1$ and second $114_2$ mesh.

The volumetric video data 102 might be encoded into a data stream 130 in a scene description language. The data stream 130 represents a scene 104 comprising one or more objects 100. In the context of FIG. 22 information related to one object 100 is described in more detail. However, it is clear that the features described in the following for one object 100 might also be applicable for another object 100.

A device 200, e. g. a data stream generator, might be configured to generate the data stream 130 by providing in a scene description language information with regard to the one or more objects 100 in the data stream 130. A device 300, e. g. a data stream evaluator, might be configured to evaluate the data stream 130 by retrieving from the data stream 130 the information with regard to the one or more objects 100. The information with regard to the one or more objects 100 comprises first mesh data $112_1$, second mesh data $112_2$, and correspondence information 150, which is detailed below. The device 200 might be configured to provide additional information in the data stream 130, which will be described in the following in the context of the data stream 130, and the device 300 might be configured to retrieve the additional information from the data stream 130. The devices 200 and 300 might be configured to perform additional steps to provide or retrieve the information/additional information.

The data stream 130 comprises for the object 100 the first mesh data $112_1$, the second mesh data $112_2$ and the correspondence information 150 of the two meshes $114_1$, $114_2$ indicated by the first mesh data $112_1$ and the second mesh data $112_2$. In case of a scene 104 with two or more objects 100, e. g. a plurality of objects 100, for example, for each object 100 of two or more objects 100 of the plurality of objects 100, first mesh data $112_1$, second mesh data $112_2$ and the correspondence information 150 is provided in the data stream 130.

The first mesh data $112_1$ describes the object 100 with the first mesh $114_1$ and the second mesh data $112_2$ describes the object 100 with the second mesh $114_2$. Mesh data, like the first mesh data $112_1$ and the second mesh data $112_2$, comprises information of the mesh $114_1$, $114_2$ with which the mesh data describes the object 100. For example, the mesh data $112_1$, $112_2$ comprises vertices positions for vertices 116 (see $116'_1$ to $116'_7$ of the first mesh $114_1$ and $116_1$ to $116_6$ of the second mesh $114_2$) of the mesh $114_1$, $114_2$ and optionally information about connections between pairs of vertices 116. Three or more vertices 116 define a face 118 (see $118'_1$ to $118'_5$ of the first mesh $114_1$ and $118_1$ to $118_4$ of the second mesh $114_2$) of the mesh $114_1$, $114_2$, wherein the information about connections between pairs of vertices 116 indicates boundaries/borders of the face. Optionally, the vertices and/or faces of the meshes $114_1$, $114_2$ are/is identifiable by an index. It is possible that the mesh data comprises additional information like normals associated with the vertices 116 or faces 118 and/or optionally skeleton information, wherein the skeleton information might comprise positions of joints and bones of the object 100 in a three dimensional space. For each vertex 116, the normal might represent an average of the normals of the faces 118 surrounding the respective vertex 116, e. g., of the faces 118 being adjacent to the respective vertex 116. See also FIG. 7 for possible information comprised by the mesh data $112_1$, $112_2$.

Optionally, further mesh data and further correspondence information is available for the object 100, wherein the further correspondence information indicates the two meshes for which it indicates the mapping. It might be possible that the further correspondence information indicates a mapping between an additional mesh indicated by the additional mesh data and the first mesh $114_1$. Optionally, the first mesh $114_1$ represents a reference mesh, e. g. a model mesh of the object 100. For all meshes describing the same object 100 but being different from the first mesh $114_1$, a correspondence information 150 might be provided in the data stream 130, wherein the correspondence information 150 indicates a mapping between the respective mesh and the first mesh $114_1$. The additional mesh data provides information for an additional mesh describing the object 100, wherein the additional mesh can be an update of the second mesh $114_2$. The correspondence information, for example, is an update of a previously transmitted correspondence information, e.g. of the correspondence information associated with the first mesh and the second mesh.

The meshes $114_1$, $114_2$ with which the object 100 is described might differ among each other in terms of a number of vertices 116 or in terms of a position of the vertices 116.

According to an embodiment, the first mesh data $112_1$ and the second mesh data $112_2$ might be associated with the same time stamp, wherein the second mesh data $112_2$ provides a refinement of the first mesh data $112_1$, e. g. in terms of the number of vertices 116. For example, the first mesh data $112_1$ provides the first mesh $114_1$ in basic quality, e. g. a basic quality level first mesh $114_1$, and the second mesh data $112_2$ provides the second mesh $114_2$ in high quality, e. g. a high quality level second mesh $114_2$. The second mesh $114_2$, for example, comprises a higher number of vertices 116 than the first mesh $114_1$.

According to an alternative embodiment, the first mesh data $112_1$ and the second mesh data $112_2$ might be associated with different time stamps, wherein the second mesh data $112_2$ represents an update of the first mesh data $112_1$. For example, the first mesh data $112_1$ provides a model mesh of the object 100 as the first mesh $114_1$ and the second mesh data $112_2$ provides a mesh based on a volumetric scan as the second mesh $114_2$. The second mesh $114_2$, for example, differs from the first mesh $114_1$ in terms of a pose of the object 100 described by the respective mesh $114_1$, $114_2$ and/or positions of vertices 116 of the meshes $114_1$, $114_2$ and/or a number of vertices 116.

According to an embodiment, the data stream 130 comprises mesh data $112_1$, $112_2$ associated with the same time stamp and mesh data $112_1$, $112_2$ associated with different time stamps. For example, the first mesh data $112_1$ and the second mesh data $112_2$ are associated with a first time stamp and the data stream 130 comprises further first mesh data and further second mesh data both associated with a second time stamp, wherein the first time stamp is not equal to the second time stamp. The further second mesh data might represent a refinement of the further first mesh data und an update of the second mesh data $112_2$. The further first mesh data might represent an update of the first mesh data.

Correspondences, e. g. provided by the correspondence information 150, are a mapping between two arbitrary meshes, i.e. the first mesh 114$_1$ and the second mesh 114$_2$, which may have different topologies, different number of vertices and/or different mesh connectivity, e. g. indicated by the information about connections between pairs of vertices 116. Each vertex 116 of a mesh, e. g. the second mesh 114$_2$, is mapped to another vertex 116 or face 118 of another mesh, e. g. the first mesh 114$_1$. The vertex correspondence, e. g. indicated by the correspondence information 150, maps a vertex 116 of the mesh of the volumetric scan, e. g. the second mesh 114$_2$, to a face 118 of a model mesh, e. g. the first mesh 114$_1$, that has information on how to be animated in one variant. Such a mapping is shown in FIG. 22 and in FIG. 23a and is understood as a vertex-to-face mapping. Another mapping discussed is vertex-to-vertex mapping, see FIG. 23b, or vertex-to-vertices mapping, see FIG. 23c.

FIG. 22 shows a volumetric scan mesh, i.e. the second mesh 114$_2$, with high level of detail, e. g. high number of vertices, and a human body model mesh, i.e. the first mesh 114$_1$, with lower vertex count and a uniform spacing.

In the following the description will mainly focus on the correspondence (mapping) between two meshes: a model mesh, e. g., the first mesh 114$_1$, which is animatable, and a volumetric scan mesh, e. g., the second mesh 114$_2$, which corresponds to a real object that uses the model to be animated. However, it should be clear that such correspondences can be used in other context representing mapping for two arbitrary meshes. Examples thereof, could be a single mesh of a volumetric scan (or any other 3D mesh representation) that changes in topology over time, e. g., having a different number and position of vertices depending on the time instance, i. e. the second mesh 114$_2$ is an update of the first mesh 114$_1$. For instance, when transitioning from one of the topologies of a mesh to the other one, e.g. from the first mesh 114$_1$ to the second mesh 114$_2$, knowing the correspondences (mapping) of two meshes can be used to improve the transition phase between the different topologies of the mesh. For instance, if there is an animation happening during that transition phase the mapping can help to avoid transformations in the different topologies that would lead to a non-seamless switch of the topologies.

In first place, the solution herein discusses methods for representing animations of objects 100 or animatable objects 100 irrespective of whether the scene 104 is a static scene or a dynamic scene (i.e., topologies of objects change or not). Thus, in a first embodiment, the scene description information contains a first mesh 114$_1$ of a model (typically with a reduced number of vertices) for which information, e. g. transformation information, is provided that allows animation (e. g. skin information or morph targets) and a second mesh 114$_2$ that corresponds to the volumetric scan, together with some mapping information, e. g. indicated by the correspondence information 150, that maps the vertices 116 of the volumetric scan, i. e. the second mesh 114$_2$, to the vertices 116 or faces 118 of the model mesh, i.e. the first mesh 114$_1$. Based on the transformation information, the first mesh 114$_1$ can be transformed to a transformed first mesh, wherein the transformed first mesh describes a different pose of the object 100 than the first mesh 114$_1$. The transformation information might comprise information for different transformations, so that different poses of the object 100 can be represented. The transformation information might indicate a type of transformation, like a scaling, a rotation or a translation. Alternatively the transformation indicates a matrix which can combine a scaling and/or a rotation and/or a translation.

Note: The model, i.e. the first mesh 114$_1$, of the volumetric scan, i.e. the second mesh 114$_2$, can be authored by a computer graphic artist using 3D content authoring tools such Blender, Maya, etc. The model of the volumetric scan can also be generated using sophisticated data-driven methods, wherein a huge dataset is used to generate a 3D model which has similar topology as that of the volumetric scan, i.e. the second mesh 114$_2$, for example, height (tall or small), body structure (fat/thin), sex (male or female), etc. The data-driven approach involves minimal human intervention to generate a so called "fit" of the volumetric scan. The aim of the model, i.e. the first mesh 114$_1$, is to provide semantic information for its mesh such as; skeleton, and minimum vertex count for mesh representation. It might be also possibly that model mesh has high details in terms of number of vertices for areas needing high fidelity such as face, etc.

More concretely, the correspondence from each vertex 116 in the volumetric scan, i.e. the second mesh 114$_2$, to a face 118 or vertex 116 of the model mesh, i.e. the first mesh 114$_1$, is given. At runtime, for example, the renderer virtually attaches the vertex to the model mesh. The model mesh is constructed with the previously fitted pose, i.e. a predetermined pose. The renderer records the distance of each vertex 116 to the plane of its corresponding model mesh face 118. It also records the barycentric coordinates of the scan vertex projected to the face 118. The second mesh 114$_2$ is dependent on the first mesh 114$_1$, for which reason the second mesh 114$_2$ might represent a dependent mesh and the first mesh 114$_1$ might represent a shadow mesh.

Figure 23A:
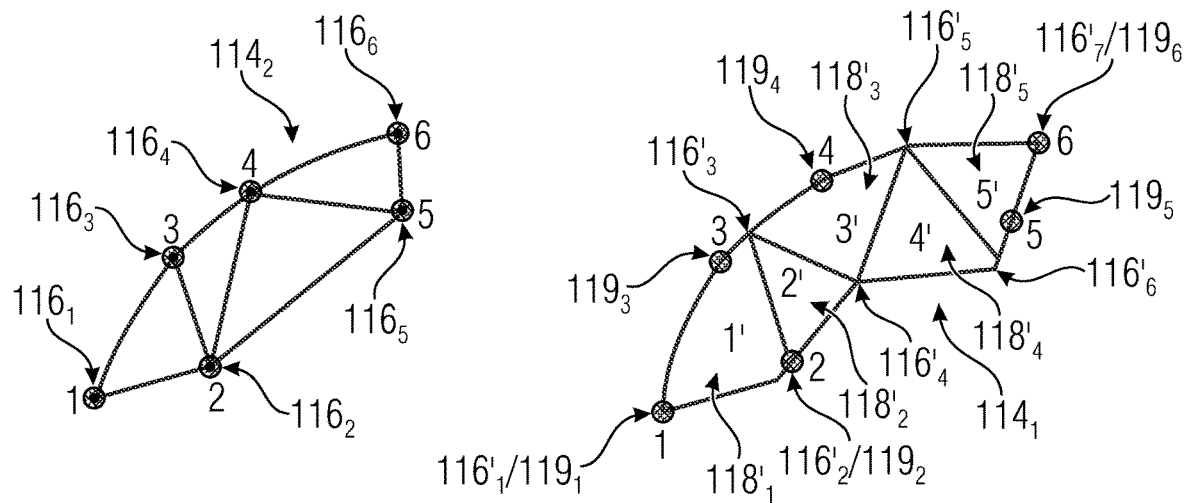
FIG. 23a shows an embodiment of a vertex-to-face mapping.

As shown in FIG. 23a for corresponding parts of the first mesh 114$_1$ and the second mesh 114$_2$, each vertex 116 (see 116$_1$ to 116$_6$) of the second mesh 114$_2$ at time t, for example, is represented by $v_{d,i}(t)$ with $i=0 \ldots N_d(t)-1$ with $N_d(t)$ being the number of vertices 116 of the second mesh 114$_2$ at time t.

Each vertex 116 (see 116'$_1$ to 116'$_7$) of the first mesh 114$_1$ is represented by $v_{s,i}$ with $i=0 \ldots N_s-1$ with $N_s$ being the number of vertices 116 of the first mesh 114$_1$. Note that the first mesh 114$_1$ is static and therefore it does not depend on the time.

The first mesh 114$_1$ can be transformed using the transformation information, so that the first mesh 114$_1$ is at the same position and pose as the second mesh 114$_2$. Using the correspondence information 150, each vertex 116 of the second mesh 114$_2$ $v_{d,i}(t)$ at time t is mapped to the $c_i(t)$-th face 118 (see 118'$_1$ to 118$_5$), where $c_i(t)$ is the correspondence value indicated for the i-th vertex 116 of the second mesh 114$_2$ at time t. The three vertices 116 corresponding to each face 118 of the first mesh 114$_1$ at the same position as the second mesh 114$_2$ and indicated by a correspondence value $c_i(t)$-th are represented by $v'_{s,j}(t)$, $v'_{s,k}(t)$ and $v'_{s,l}(t)$. The correspondence information 150, shown in FIG. 22, indicates which vertex 116 of the enlarged porting of the second mesh 114$_2$ corresponds to which face 118 of the corresponding enlarged porting of the first mesh 114$_1$.

The distance from $v_{d,i}(t)$ to the plane defined by $v'_{s,j}(t)$, $v'_{s,k}(t)$ and $v'_{s,l}(t)$ and the projected point within the given face $p_i(t)$ is computed as follows.

An orthonormal vector to the $c_i(t)$-th face 118 is defined as:

$$\hat{n}_{c,i}(t) = \frac{(v'_{s,k}(t) - v'_{s,j}(t)) \times (v'_{s,l}(t) - v'_{s,j}(t))}{\|(v'_{s,k}(t) - v'_{s,j}(t)) \times (v'_{s,l}(t) - v'_{s,j}(t))\|}$$

where x is representing the cross product of two vectors.

The vector $(v'_{s,j}(t) - v_{d,i}(t))$ is projected onto $\hat{n}_{c,i}(t)$ and added to the vertex $v_{d,i}(t)$ to determine the point $p_i(t)$.

$$p_i(t) = v_{d,i}(t) + ((v'_{s,j}(t) - v_{d,i}(t))\hat{n}_{c,i}(t))\hat{n}_{c,i}(t)$$

For example, the projected point $p_i(t)$ of the vertex $116_3$ in the face $118'_1$ is indicated by $119_3$. The projected point of the vertex $116_1$ is $119_1$, of the vertex $116_2$ is $119_2$, of the vertex $116_4$ is $119_4$, of the vertex $116_5$ is $119_5$ and of the vertex $116_6$ is $119_6$.

And the distance to the plane is determined as:

$$d = \|v_{d,i}(t) - p_i(t)\|$$

Finally, the projected point $p_i(t)$ is transformed to barycentric coordinates as follows:

$$p_{i,u}(t) = \frac{\text{Area}(v'_{s,j}(t), v'_{s,k}(t), p_i(t))}{\text{Area}(v'_{s,j}(t), v'_{s,k}(t), p_i(t))}$$

$$p_{i,v}(t) = \frac{\text{Area}(v'_{s,j}(t), v'_{s,l}(t), p_i(t))}{\text{Area}(v'_{s,j}(t), v'_{s,l}(t), p_i(t))}$$

$$p_{i,w}(t) = 1 - p_{i,u}(t) - p_{i,v}(t)$$

Thus, when the $c_i(t)$-th face 118 of the first mesh $114_1$ is transformed by an animation, the computed barycentric coordinate can be used at that face 118 represented by $v''_{s,j}(t)$, $v''_{s,k}(t)$ and $v''_{s,l}(t)$ and using the corresponding point and the computed distance the corresponding vertex 116 of the second mesh $114_2$ can be determined at the same relative position.

This relative location is held fixed, virtually gluing the mesh vertex 116 of the second mesh $114_2$ to the face 118 of the first mesh $114_1$, i.e. the model mesh primitive (for example triangle—face); with constant distance and orientation. With this parametrization between each volumetric scan frame and the model, an animation, skin modification or morphing of the model can directly be transferred to the volumetric scan. In other words, the transformation of the first mesh $114_1$ can be applied to the second mesh $114_2$. Such an application or transfer can be indicated in the data stream 130 by application information.

As described above, the pose and position of the second mesh $114_2$ and the first mesh $114_1$ might be the same for the determination of the correspondence information, wherein the first mesh can be transformed to the pose of the second mesh. The pose of the second mesh might represent a predetermined pose for the correspondence information determination. This conform pose and/or position of the two meshes $114_1$ and $114_2$ might also apply for a determination of one of the following mappings, i.e. the vertex-to-vertex mapping and the vertex-to-vertices mapping.

Figure 23B:
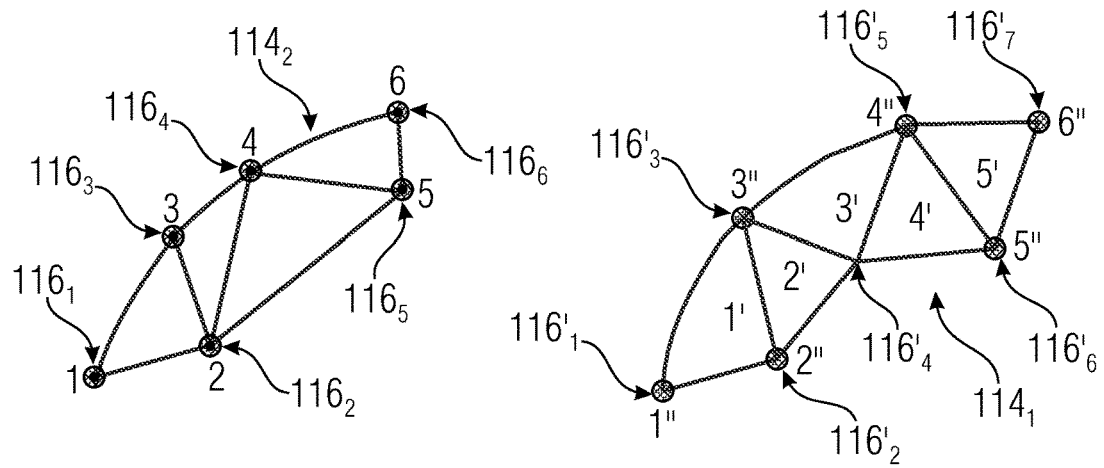
FIG. 23b shows an embodiment of a vertex-to-vertex mapping.

At the vertex-to-vertex mapping, as shown in FIG. 23b, a vertex 116 (see $116_1$ to $116_6$) of the second mesh $114_2$ is mapped to a vertex 116 (see $116'_1$ to $116'_7$) of the first mesh $114_1$. For example, for each vertex 116 of the second mesh $114_2$, the vertex 116 of the first mesh $114_1$ with the smallest deviation of its position from a position of the respective vertex is chosen as the corresponding vertex 116 of the first mesh $114_1$. As shown in FIG. 23b, for example, the vertex $116_1$ corresponds to the vertex $116'_1$, the vertex $116_2$ corresponds to the vertex $116'_2$, the vertex $116_3$ corresponds to the vertex $116'_3$, the vertex $116_4$ corresponds to the vertex $116'_5$, the vertex $116_5$ corresponds to the vertex $116'_6$ and the vertex $116_6$ corresponds to the vertex $116'_7$.

Figure 23C:
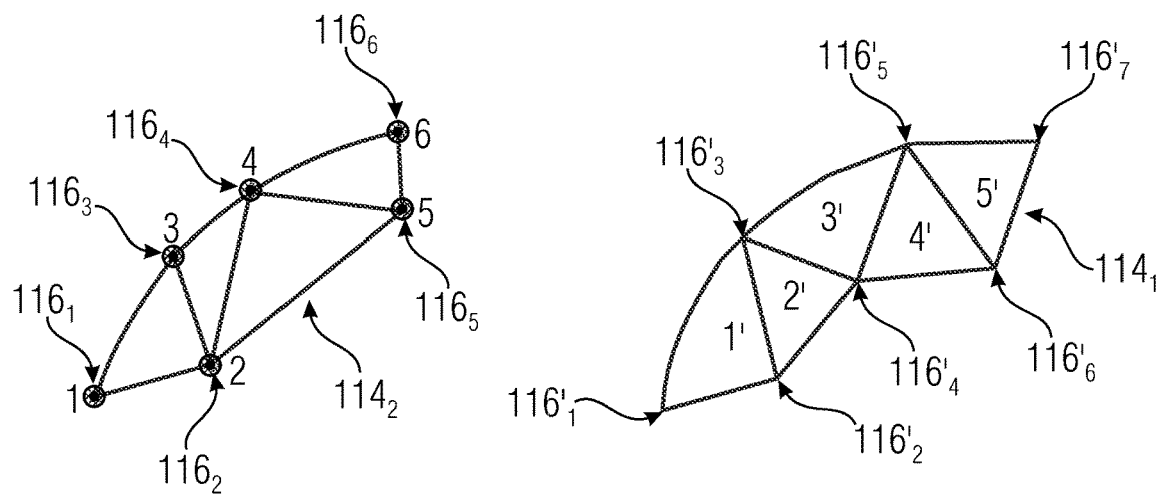
FIG. 23c shows an embodiment of a vertex-to-vertices mapping.

At the vertex-to-vertices mapping, as shown in FIG. 23c, a vertex 116 (see $116_1$ to $116_6$) of the second mesh $114_2$ is mapped to two or more vertices 116 (see $116'_1$ to $116'_7$) of the first mesh $114_1$, wherein it is possible that some of the vertices 116 of the second mesh $114_1$ are only mapped to one vertex of the first mesh $114_1$. For example, for a vertex 116 of the second mesh $114_2$ two or more vertices 116 of the first mesh $114_1$ with the smallest deviations of their positions from a position of the respective vertex 116 are chosen as the corresponding vertices 116 of the first mesh $114_1$. As shown in FIG. 23c, for example, the vertex $116_1$ corresponds to the vertex $116'_1$, the vertex $116_2$ corresponds to the vertex $116'_2$, the vertex $116_3$ corresponds to the vertex $116'_3$, the vertex $116_4$ corresponds to the vertices $116'_3$ and $116'$s, the vertex $116_5$ corresponds to the vertex $116'_6$ and $116'_7$ and the vertex $116_6$ corresponds to the vertex $116'_7$.

The vertex correspondence between two meshes $114_1$ and $114_2$ can be computed on-the-fly using sophisticated algorithms, which would avoid having to send the correspondence values to the client. Another option would be to pre-computed the vertex correspondence during content production. The volumetric scan along with its vertex correspondence to a model is made available for rendering. The content author would export the model and the volumetric scan with its vertex correspondence to the model in gITF. However, the semantics for vertex correspondence have to be introduced as an extension to gITF.

On-the-Fly Vertex Correspondence

As discussed above, in the case of on-the-fly vertex correspondence computation, the client, i.e. the device 300, itself does the computation to determine correspondences of the two meshes with an additional cost of complexity. For such a solution, a mesh relation, i.e. the mapping indicated by the correspondence information 150, has to be established (similar as above). As already discussed, the gITF file can be extended to incorporate the mesh index against which a correspondence is to be calculated, e.g., the data stream 130 signals together with the second mesh data $112_2$ and the correspondence information 150 a pointer indicating the first mesh $114_1$ out of a plurality of meshes. In a further embodiment, in addition to the mesh relationship (indication that two meshes correspond to the same object—model and volumetric scan) the gITF provides a value from a set of algorithm (ENUM_ALGO) to choose from on the fly calculation. Thus, a guidance is provided to the client on how the it should carry out the computation of the correspondences. The algorithm might be indicated by evaluation information comprised by the data stream 130.

Such an exemplary extension is shown in FIG. 24.

To establish the scan-to-model correspondences, i.e. the correspondence information 150, on-the-fly, knowledge of the vertex positions of the scan, i.e. the second mesh $114_2$, is needed, as well as the fully posed model mesh, i.e. the first mesh $114_1$, including the surface (e. g. face triangle) definition.

For each scan vertex, see vertices $116_1$ to $116_6$, the relative location closest to the surface of the model mesh, i.e. the first mesh $114_1$, has to be calculated. Thus, the surface of the model mesh needs to be represented in a data structure, i.e. the first mesh data $112_1$, that can be queried with single 3D points.

Option AABB: One option is to store the model mesh primitives (e. g. triangles) in an axis-aligned bounding box hierarchy (AABB). From AABB we can query the true point-to-surface distance from scan to model.

Option KD-tree: If the cost of constructing the AABB is too prohibitive at runtime, it's possible to approximate the problem of point-to-surface distance with simpler data structures, such as a KD-tree, in some cases. For a triangle-based model mesh with uniform triangle sizes, a KD-tree of the model mesh triangle centroids can be constructed, and then queried to get the triangle, i.e. the face 118, of the approximately nearest surface point.

Although the AABB algorithm provides a better solution than the KD-tree algorithm, in many cases the KD-tree algorithm provides a good enough result, needing a lower computational complexity. At the content generation step, it could be determined whether this is the case and therefore the gLTF file could contain indication that would assist the client to know whether the AABB algorithm should be used or the KD-tree algorithm can be used without leading to undesirable poor quality. These two algorithms are provided as an example, but obviously more could be added and the gLTF file would indicate which is the most adequate, e. g. in terms of quality and computational complexity. The algorithm might be indicated by evaluation information comprised by the data stream 130.

Additional Vertex Check: To avoid mismatches in the queries in parts of the model with small details in close proximity, such as separate fingers of the same hand, a normal check can be added to the query, both for the AABB and the KD-tree option. Model faces (see $118'_1$ to $118'_5$) whose normal do not point in the same hemisphere as the scan vertices' (see $116_1$ to $116_6$) normal are disregarded in the query process. When using the vertex check, vertex normals for the scan, i.e. the second mesh $114_1$, and face normals for the model mesh, i.e. the first mesh $114_1$, are needed as inputs as well. As encoding and sending the scan vertex normals along with the other scan data would be excessive for the use case of on-the-fly correspondence calculation, scan vertex normals should be computed on-the-fly as well, as the average of the incident face normals. An area- or angle-based weighting scheme can be used to avoid bias from non-uniform faces in the scan.

Leveraging ray-tracing hardware: Specialized hardware in GPUs used for ray tracing rendering applications could potentially be used to speed up the point-to-surface query process considerably. Implementation of the algorithm would depend on the availability of hardware instructions and SDK (e. g. Nvidia RTX cores).

Pre-Computed Vertex Correspondence

Vertex Correspondence Sematic in gITF for a Single Mesh Object

In order to provide vertex correspondence, e.g. indicated by the correspondence information 150, the scene description information needs to be extended. For instance, in case of gITF the solution could look as shown in FIG. 25.

In this first example, the yellow highlighted lines correspond to the transformation information, i.e. the skinning matrices and morph targets, of the model, i.e. the first mesh $114_1$, and the green highlighted lines correspond to an extension of the mesh object of the model (i.e. the volumetric scan, i.e. the second mesh $114_2$, that is mapped to it). The extensions provide accessors for the volumetric scan mesh and its vertex correspondences to the mesh of model. Thus, a player that does not understand the extension can still play and render the model, ignoring the additional information. However, a player that understands the extension can render the volumetric scan and can establish the geometric relationship, i.e. the correspondence information 150, between the volumetric scan and the model using the vertex correspondence.

The volumetric scan may have different number of vertices as that for the model, therefore the extension should also include the texture coordinates, i.e. indicated by texture information in the data stream 130, that applies to the volumetric scan. Note that the volumetric scan may have a different texture material than that of the model, i.e. not only the texture coordinates might be different but also the actual texture, which is provided as a material and is referred in primitive.material property, i.e. the texture information, which further refers to a texture.

Alternatively, the volumetric video scan can be provided as a mesh entry in the gITF file with an extension which includes the model-mesh. Thereby, it would be possible to players not understanding the extension to simply play back the volumetric scan without any knowledge of the model associated with it, meaning that no animation of the volumetric scan would be possible. The correspondence of scan-to-model will be the part of the gITF extension.

If the model mesh is an extension to the volumetric scan mesh, the nodes that refers to skin, children, animations, samplers all apply to the model indicated in the extension. Indication that those apply to the mesh provided in the extension is needed so that players not understanding the extension, ignore such parameters.

Vertex Correspondence Sematic in gITF for Multi-Mesh Objects

Another alternative would be that the gITF file contains several meshes 114 separately. In a further embodiment, different meshes 114 are used and a link signaling, e. g. the correspondence information 150 or the association information comprised by the correspondence information 150, is provided in gLTF, i.e. which is an indication of which is the model mesh that needs to be used for a volumetric scan mesh. An example can be seen in FIG. 26.

In other words, the association information might indicate the first mesh $114_1$ as a reference mesh, i.e. a shadow mesh, of the second mesh $114_2$, wherein the association information indicates one mesh out of a plurality of meshes as the first mesh $114_1$. The first mesh $114_1$ might be the reference mesh, since a transformed first mesh corrected based on the correspondence information 150 might represent the second mesh $114_2$ describing the object in a further pose, e.g. in a pose differing from an initial pose described by the second mesh $114_2$. The transformation of the first mesh $114_1$ can be easily translated over to the second mesh $114_2$ using the correspondence information 150.

As shown in the example, new primitives are added as an extension to a mesh 114. In this case, several meshes 114 are indicated, with one of the meshes 114 having the extension which indicates that it is dependent (i.e. the volumetric scan that applies to a model) and such a mesh, i.e. the second mesh $114_2$, would include in addition to the vertices the correspondence information 150 and mesh.index that point to the model mesh, i.e. the first mesh $114_1$. In the example above the relationship of two meshes $114_1$ and $114_2$ is indicated in the gITF file itself. Another option is that such information is provided externally, e. g., in a file format, as in some cases that dependency could be dynamically changing.

Note that in such a case, the player should only render one of the meshes. Mapping of a single mesh to a node is done in such a way that if the player does not understand the extension only either the volumetric scan being not animatable is shown or the model being animatable is shown, depending on what is indicated in the gLTF file.

Vertex Correspondence Description

As aforementioned, correspondences carry out mapping of two different meshes $114_1$ and $114_2$. Such mapping could be carried out in different ways.

One option would be, the "CORRESPONDENCE", i.e. the correspondence information 150, contains data which map a vertex 116 of the volumetric scan mesh, i.e. the second mesh 114$_2$, to a vertex 116 of the model mesh, i.e. the first mesh 114$_1$, either by indicating the index of the vertex in model mesh (integer i expressing the i-th entry in the model mesh) or by directly expressing the vertex (not as an integer but as a point in the space, i.e. the position information).

Another option consists of a vertex-to-face relation. A set of vertices 116 can point to a single face. As shown in FIG. 23a, for example, the set of vertices 116$_1$ to 116$_3$ point to the face 118'$_1$.

As for the previous case, two options are possible, i.e. pointing using index or pointing using the vertex, i.e. vertex position, of the model itself:

In case of Indexed geometry(model), the "CORRESPONDENCE" data contains data for correspondence establishment between a vertex in volumetric scan to an index of a mesh primitive (default triangle) of the model, i.e. the index of a face 118 of the first mesh 114$_1$ is indicated for a vertex 116 of the second mesh 114$_2$, wherein the vertex 116 of the second mesh 114$_2$ can be indicated by its position or by its index.

In case of non-indexed geometry(model), the "CORRESPONDENCE" data contains data for correspondence establishment between a vertex in volumetric scan to vertex attributes of a mesh primitive of the model, i.e. the position of the vertices 116 associated with a face 118 of the first mesh 114$_1$ is indicated for a vertex 116 of the second mesh 114$_2$, wherein the vertex 116 of the second mesh 114$_2$ can be indicated by its position or by its index.

In other words, the correspondence would be carried out through storing accessors pair for vertex indices(model) and vertex (volumetric scan), or vertices(model) and vertex (volumetric scan).

gITF allows different modes for the primitives of a mesh:
Allowed values for Modes
0 POINTS
1 LINES
2 LINE_LOOP
3 LINE_STRIP
4 TRIANGLES (default)
5 TRIANGLE_STRIP
6 TRIANGLE_FAN The order of the vertices 116 used in calculation will affect the direction of the surface normal (in or out of the face 118).

For the case of indexed geometry, three consecutive elements of the indices accessor are assumed to contain the indices of a single triangle, i.e. face 118.

For non-indexed geometry, three elements of the vertex attribute accessors are assumed to contain the attributes of the three vertices of a triangle Three consecutive elements of indices accessors are assumed to contain a triangle, i.e. a face 118 (for primitive.mode=4). So, an indirect relation between the assumed series of triangle (mesh of the model) to vertices 116 in scan can be stored in the correspondence data, i.e. the correspondence information 150. This option would involve a client-side logic to understand the correspondence data and construct the vertex-to-face relationship, i.e. the mapping indicated by the correspondence information 150.

One could define different indexed geometries, e. g. using as faces 118 rectangles instead of triangles (although triangles are very common), and this should be indicated in the primitive.mode property. For instance, in the example shown in FIG. 26 the primitive.mode is equal to 4, assuming triangles.

Thus, in one embodiment the gITF file indicates whether the correspondence values, e.g. indicated by the correspondence information 150, are applicable for an index or a non-indexed mesh (either via new attribute or using the primitive.mode indication in the model). It is also possible to have correspondence values to an indexed mesh without using the defined indexed property. In that case, the correspondence values could be defined as vertex(model)-to-vertices(scan) relationship for different defined/undefined modes of primitive for example triangle, polygon, etc, which needs to be indicated.

Note that the "extensions.MPEG_primitives.CORRESPONDENCE" value, e.g. indicated by the correspondence information 150, is an accessor which refers to a bufferView that contains the properties which define the type and layout of the vertex correspondence data. Such an accessor could be of the Type SCALAR with Component Type UNIT and be used for a Vertex correspondence to a different mesh. See also FIG. 27 for an excerpt of a possible definition table.

A direct relationship between a model-vertex and position of the model-vertex can be represented in the correspondence. In which case, the correspondence data stores the vertex element from the model. For example, with a model-vertex with three vertex components and component type as float, the data stored in the correspondence can be structured to be used for a Vertex correspondence to a different mesh. See also FIG. 28 for an excerpt of a possible definition table.

A non-indexed geometry can, for example, be laid out as can be seen in FIG. 29.

In such a case of non-indexed model geometry, there can be different ways to express correspondence data.

Correspondence data, i.e. the correspondence information 150, stores the relationship for the scan vertex, i.e. the vertex 116 of the second mesh 114$_2$, to a set of specific model vertices, i.e. the vertices 116 of the first mesh 114$_1$. In one option, the correspondence data includes the position values of the model-vertices (e. g. VEC3). The example shown in FIG. 29 contains a non-indexed geometry. The correspondence data would store an array of model-vertex as correspondence data for each scan-vertex. For example, with a model-vertex with three vertex components and component type as float, the correspondence data stores an array of vertices as shown in FIG. 30.

Another option could be to re-use the model-vertex data present in "POSITION" accessors of the model. In which case, the correspondence data stores a pool of vertices 116 from the "POSITION" accessor of the model mesh.primitives. For example; the correspondence data stores number of vertex entries present in the "POSITION" accessors of the model, i.e. the first mesh 114$_1$, as shown in FIG. 31.

The above detailed examples showcase data representation for correspondence which is defined to be aligned in the order of the scan-vertex data storage in the buffer.

Dynamic Update

When it comes to dynamic scenes, gITF does not support them as such. Buffers in the gITF files are described as static (mesh vertices' positions, etc. do not change over time), the number of nodes defined in gITF, meshes, etc. are valid for the whole presentation. However, some extensions have been studied that allow to support dynamic scenes in gITF by extending the buffer to be refreshed at a given refresh rate, e. g. if the mesh is a dynamic mesh that changes with a framerate of 25 fps. Also, for updates in the scene itself, e. g., number of nodes, JSON patches have been considered.

In a further embodiment, the vertex correspondence information 150 can be dynamically provided to the user. This could be done by streaming it, e. g. using HTTP streaming. As the correspondence is targeted to a volumetric scan mesh, e.g. the second mesh $114_2$, the mesh $114_2$ and the correspondences are encapsulated and streamed together, with the same update rate. In other words, the second mesh data $112_2$ and the correspondence information 150 can be provided in the data stream 130 with the same update rate. As an encapsulation format, it might be needed to store the properties and format of the correspondences. In another embodiment the correspondence and its format are defined as follows. A new timed meta data, for example, needs to be specified.

A new sample entry in the file format is specified that allows identifying that the stored media are correspondences. One VerticesCorrespondenceConfigBox, e.g. indicated by the correspondence information 150, is included in the sample entry to determine the format. VerticesCorrespondenceConfigBox provides information as how many entries, correspondence values, and their format, e. g., length in bytes of the correspondence values. This can be seen in FIG. 32. The length of the correspondence values, for example, is configurable.

One example of the format description the correspondence_type, e.g. indicated by the correspondence information 150, that specifies how the correspondence values are store. E. g., a value of 0 could be that a simple integer specifying the face index of the model is used in each sample (described below) and in such a case the length (e. g. in number of bytes) to identify the face index is also specified. Another property in the sample entry could be whether the number of correspondences is static or dynamic for the whole presentation. If so, it is indicated and the number of correspondences is given in the sample entry. Otherwise, it is indicated that it is not the case and the number of correspondences per sample (time instant) is given in the sample itself. Such an integer can be used as described above for indexed meshes. Another option is also shown for correspondence_type equal to 1 where the three components of a vertex position are given directly (this one would correspond to the vertex-to-vertex mapping). For vertex-to-vertices mapping, there can be two types; correspondence_type=2, specifying an array of vertices present in the "POSITION" accessors of the model; correspondence_type=3 specifying an array of vertex positions of the model. The configuration box provides the number of vertices for each correspondence type 2 or correspondence type 3. The number of vertices can be dynamic i.e. the correspondence could be established for three model-vertices and dynamically changed to four model-vertices.

Then the samples are provided in the track that contains the actual values for each time instant. This can be seen in FIG. 33.

The case shown above, correspondence_type equal to 0 considers that correspondences are stored between vertices 116 of the volumetric scan, i.e. the second mesh $114_2$, and faces 118 of the model mesh, i.e. the first mesh $114_1$, using a list of integers, the length of the number of vertices of the scan is indicated as discussed above either dynamically or statically. The integers index into the face number of the model mesh. correspondence_type equal to 1 considers the point in the space directly.

Alternatively, the different formats of whether integer values are used to store the correspondences or instead the points in the space of another mesh are used directly, is provided by the sample entry type itself, using different ones, e. g. 'vco1' and 'vco2' omitting thus correspondence_type as this is equivalently provided by the 4 cc as described.

Note that the linkage or connection, i.e. the mapping indicated by the correspondence information 150, of two meshes (model and scan) in the gITF file examples could be done outside the gITF file itself as already pointed out. If that is the case, the sample formats of sample themselves would need to carry out such a mapping.

Therefore, in another embodiment, in order to establish a geometric relation between the two meshes and thus indicate that the volumetric scan mesh is linked to a model mesh, the vertex correspondence sample, i.e. the correspondence information 150, indicates a mesh index used for a reference while establishing the correspondences.

If the reference was for instance static, it would make more sense to add it to the sample configuration box, as can be seen in FIG. 34.

And if such a reference was dynamic, it would make more sense to add it to the samples themselves instead, as can be seen in FIG. 35.

As the correspondences do not have any meaning by themselves and are to be interpreted together with the volumetric scan, the track is linked to one or more tracks of the volumetric scan mesh with a 'cdsc' track reference, describing each of the referenced volumetric scan mesh tracks individually. There is a constraint that the number of vertices needs to be the same in both.

The solutions described above, consist on providing information that relates two meshes $114_1$ and $114_2$ and a further information, i.e. the correspondence information 150, that indicates a mapping, i.e. the correspondences. As already, discussed, providing the correspondences to the client by some means in gITF and file format allows that the computation at the client side are to some extent lightweight. Similar solutions can be realized for other correspondence types.

The dynamic information provided is passed to an accessor that updates its information over time. This is already defined in a MPEG media extension that provides also a reference to the timed accessors using timedAccessors objects. An example thereof can be seen in FIG. 36.

Although it has not been discussed in the document, another alternative would be to do a face-to-face mapping of different meshes $114_1$ and $114_2$, which would save some data to be transmitted if indexed meshes were used as only one index per face 118 would be sent.

Pose Update

The main discussion above has focused on correspondences of two meshes $114_1$ and $114_2$ that need to be linked together; a model mesh, i.e. the first mesh $114_1$, for which information is provided so that it is animatable and the second mesh $114_2$, i.e. the volumetric scan, that can use the model mesh animation to be animated as well.

However, the volumetric scan mesh is updated in time, i.e. with a given framerate that depends on the capturing process. Whenever a volumetric scan mesh is provided, this corresponds to a particular pose of the object. Such a pose needs to be provided as well. This pose might be understood as the predetermined pose and might be used to determine the correspondence information 150.

Pose information is needed to transform joint/bones of the model's skeleton. An initial pose is needed to fit the model pose to the pose of the volumetric scan. The pose can be updated dynamically. The pose information involves transformation matrix(4×4) for each joint/bones of the model's skeleton. An example can be seen in FIG. 37.

That transformation of the joints/bones is provided as shown in the example above by translation/rotation attributes of the nodes. In the example above, this transformation is given statically once and then potentially modified by animations. However, in the discussed case, such a transformation should be given each time that a volumetric scan mesh is provided as a new frame. In other words, the data stream 130, for example, signals together with the second mesh data $112_2$ the transformation information for transforming the first mesh $114_1$, wherein the transformation information indicates a transformation for transforming the first mesh $114_1$ to the pose associated with the second mesh $114_2$.

The node transformation property data can also be stored in accessors. For dynamic updates, the accessors can be updated in timely fashion for example using a timedAccessors.

The node properties can also be transformed using animations mechanism defined in gITF2.0 as shown in FIG. 38. The sampler.output stores the key frame transformations e. g. rotation values for node 2 in accessors 9 as highlighted in yellow. For a dynamic update, the sampler.output can refer to a timedAccessors which stores per frame rotation values of node 2. Careful consideration should be taken as timing of the animation could controlled by external means. The sampler.input stores the timing information of the key frames used for playback of the animations. The accessors referred by sampler.input (accessors 8 in the example highlighted in green as shown in FIG. 38) can be dynamically updated e. g. using timedAccessors.

Similar to the integration in HTTP streaming or file format for correspondences, a timed metadata for these transformations are needed. A new sample entry in the file format is specified that allows identifying that the transformation data for joint nodes of the skeleton.

The JointsConfigBox ('jcob'), e.g. indicated by the transformation information for the first mesh $114_1$, stores the array of node indices in joints_to_transform which will be transformed with the pose update. In other words, the transformation information indicates joints and/or bones of the object and transformations, which are to be applied to the indicated joints and/or bones, so that a transformed first mesh, i.e. the first mesh after application of the transformation, describes the object with the same pose as the pose described by the second mesh, wherein the pose described by the second mesh represents a pose update of a pose described by the first mesh before the transformation. In case where the transformation data is available as separate properties such as translation, rotation or scale, the transform_type_flag is equal to 0. Otherwise, transform_type_flag is set to 1, when the expected transformation data is a 4×4 matrix. In case of transform_type_flag equal to 0; the transform_property enumeration ensures which property of the node is transformed. This is exemplary shown in FIG. 39.

The samples are provided in tracks which stores the actual transformation data for joint(s). The JointsTransformationSample, e.g. indicated by the transformation information for the first mesh $114_1$, provides the transformation data for joints. The sample can contain the transformation data for multiple joints in a single sample or can contain the transformation data for a single joint. In scenarios where multiple joints are transformed, sample containing transformation data for multiple joints could be useful in providing a synchronization between different transformations. This is shown in FIG. 40.

Figure 41:
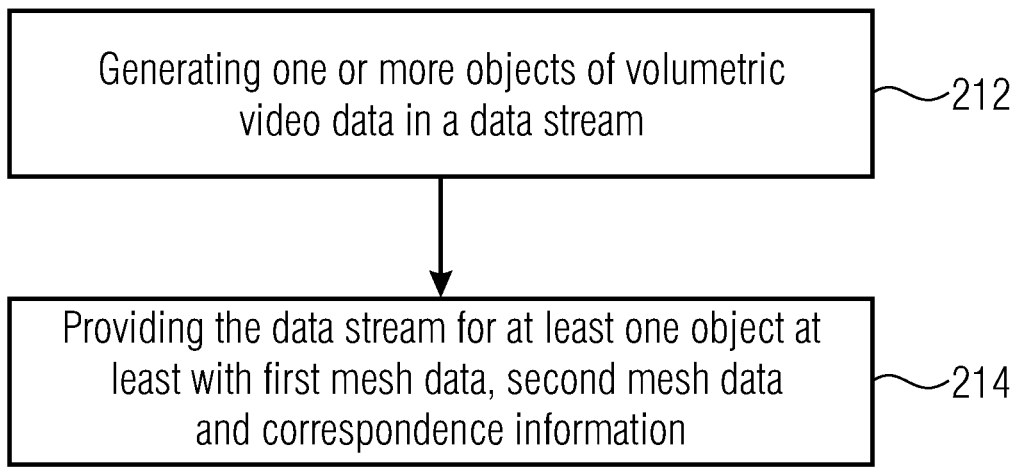
FIG. 41 shows an embodiment of a method configured for providing correspondence information in a data stream.

An embodiment, as shown in FIG. 41, relates to a method 210 of generating the data stream 130 comprising generating 212 one or more objects 100 of volumetric video data into the data stream 130 in a scene description language and providing 214 the data stream 130 for at least one object 100 at least with the first mesh data $112_1$, the second mesh data $112_2$ and the correspondence information 150. The method 210 can be completed with all features and functionalities, which are also described with regard to the device 200 in FIG. 22.

Figure 42:
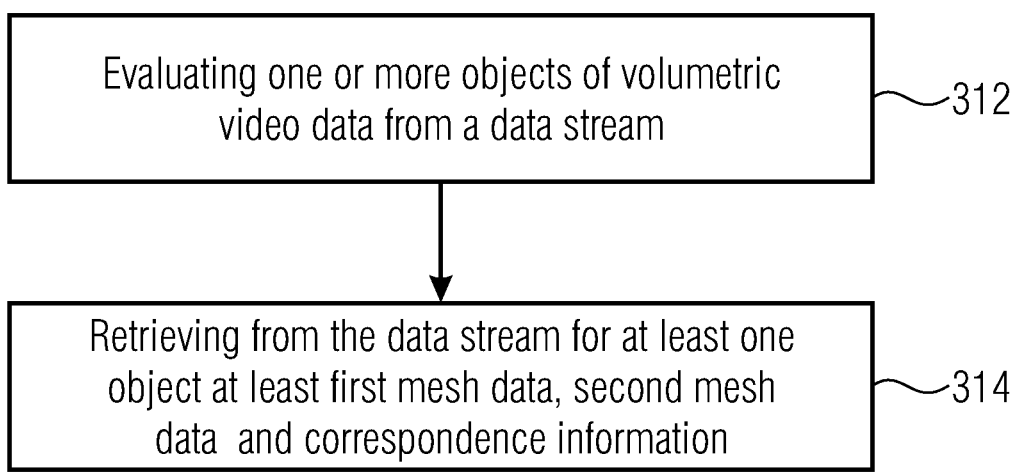
FIG. 42 shows an embodiment of a method configured for retrieving correspondence information from a data stream.

And an embodiment, as shown in FIG. 42, relates to a method 310 of evaluating the data stream 130 comprising 312 evaluating one or more objects 100 of volumetric video data from the data stream 130 into which the one or more objects 100 are encoded in a scene description language and retrieving 314 from the data stream 130 for at least one object 100 at least the first mesh data $112_1$, the second mesh data $112_2$ and the correspondence information 150.

The method 310 can be completed with all features and functionalities, which are also described with regard to the device 300 in FIG. 22.

CONCLUSION

As a brief summary, an object and two set of vertices represent the same object. In addition, signaling maps one set of vertices of the object to the other set of vertices of the same object providing some relationship.

One example is that the first set of vertices corresponds to a model and the other to a volumetric scan (they correspond to the same time instant).

Another example is a set of vertices of an object that changes over time. To achieve some kind of consistency, such relationship of the sets is indicated corresponding to different time instants.

In the first example:
1. The first set of vertices and information on how to define face structures, with additional information that allows transformations of the mesh (e. g., animation/interaction)
2. With the mapping (correspondence) information that transformations can be applied to the second mesh.
   a. The scene description file provides a mesh with two set of vertices one of it being an extension to another
   b. The scene description file provides two meshes and a linking information to identify the two associated set of vertices for the same object.
3. The first set of vertices/faces (or more accurate—mesh structure) does not change over time (i.e., static topology)—Alternatively, one could say it only changes very unfrequently. While the second set of vertices changes often or much more frequently than the first.
4. Updates for the second set of vertices/faces are provided and thereby as well the mapping information.
   a. This is provided for streaming applications, e. g. HTTP streaming and association information is provided that link the new set of vertices with mapping information.
   b. The format for the mapping information indicates:
      i. Number of values and/or whether the number of values changes over time or not (if static or dynamic)
      ii. length of the correspondence values.
      iii. Index to a face
      iv. Index to a vertex
      v. One vertex
      vi. A set of vertices defining a face vii. link between the two set of vertices (if not provided in the gLTF file)
5. Together with an update of the second set of vertices the new pose to which it corresponds is transmitted as well. Also, some additional information is provided:
   a. number of joints
   b. type of transformation
   c. transformation information, scaling, rotation, translation values or a matrix as a combination thereof.
6. Texture coordinates and/or textures themselves are also provided to be used for the second set of vertices that are modified accordingly to the transformed first set of vertices.
7. As an alternative to providing the mapping information, the mapping information computation is being left for the client to perform. The client is guided on how to perform such mapping information, e. g. which algorithm, to use.

In the second example, similar information is provided but the second set of vertices is simply an update of the first set of vertices. So, both set of vertices would have information that allows for animation.

To conclude, the embodiments described herein can optionally be supplemented by any of the important points or aspects described here. However, it is noted that the important points and aspects described here can either be used individually or in combination and can be introduced into any of the embodiments described herein, both individually and in combination.

Different inventive embodiments and aspects have been described above.

Also, further embodiments will be defined by the enclosed claims.

It should be noted that any embodiments as defined by the claims can be supplemented by any of the details (features and functionalities) described above.

Also, the embodiments described above can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in a device (device for generating a data stream or device for evaluating a data stream) and/or a method (method of generating a data stream or method of evaluating a data stream) and/or a data stream and/or a computer program product. Thus, any of the features described herein can be used in the context of a device, a method, a data steam and/or a computer program product.

Moreover, features and functionalities disclosed herein relating to a method can also be used in a device (configured to perform such functionality). Furthermore, any features and functionalities disclosed herein with respect to a device can also be used in a corresponding method. In other words, the methods disclosed herein can be supplemented by any of the features and functionalities described with respect to the devices.

Also, any of the features and functionalities described herein can be implemented in hardware or in software, or using a combination of hardware and software, as will be described in the section "implementation alternatives".

Implementation Alternatives:

Although some aspects have been described in the context of an apparatus, it is clear that these aspects also represent a description of the corresponding method, where a device or a part thereof corresponds to a method step or a feature of a method step. Analogously, aspects described in the context of a method step also represent a description of a corresponding apparatus or part of an apparatus or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any parts of the methods described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Device for evaluating a data stream configured to:
   evaluate one or more objects of volumetric video data from a data stream into which the one or more objects are encoded in a scene description language, the data stream representing a scene comprising one or more objects; and
   retrieve from the data stream for at least one object at least first mesh data, second mesh data and correspondence information, wherein
   the first mesh data describes the at least one object with a first mesh;
   the second mesh data describes the at least one object with a second mesh; and
   wherein the correspondence information indicates a mapping between the first and second mesh.

2. Device according to claim 1, further configured to generate a presentation of the at least one object by evaluating the first mesh data, the second mesh data and the correspondence information.

3. Device according to claim 1, wherein the mapping between the first and second mesh is one of
   a vertex to vertex mapping,
   a vertex to face mapping, and/or
   a vertex to vertices mapping.

4. Device according to claim 1, wherein the first mesh data comprises transformation information for a transformation of the first mesh so as to describe different poses of the at least one object.

5. Device according to claim 4, wherein the transformation information comprises one or more of
   skeleton data comprising bones data, joint data, and/or weight data for skinning, and
   one or more morph targets for each of a set of vertices of the first mesh, or for each of a set of vertices of the first mesh, a vertex position for each of the different poses of the at least one object.

6. Device according to claim 4, wherein the transformation relates to an animation, skin modification or morphing of the at least one object.

7. Device according to claim 4, wherein the correspondence information provides application information for applying the transformation of the first mesh to the second mesh.

8. Device according to claim 4, wherein the first mesh data relates to a first time stamp and the second mesh data relates to a second time stamp wherein the second mesh is an update of the first mesh, and the second mesh data comprises further transformation information for a further transformation of the second mesh so as to describe different poses of the at least one object.

9. Device according to claim 4, wherein the transformation information comprises one or more of a type of transformation, scaling, rotation, translation values or a matrix as a combination thereof.

10. Device according to claim 1, wherein the first mesh data and/or the second mesh data comprises skeleton data describing a skeleton pose of the at least one object.

11. Device according to claim 1, wherein the second mesh comprises more vertices than the first mesh.

12. Device according to claim 1, wherein the second mesh data comprises texture information for a texture of a mesh.

13. Device according to claim 1, wherein the first mesh is constant over time and/or the second mesh is varying over time.

14. Device according to claim 1, wherein the device further retrieves from the data stream further second mesh data which defines an update of the second mesh, and an indication of a first pose of the at least one object which the first mesh data relates to, and a second pose of the at least one object which the second mesh data relates to.

15. Device according to claim 1, wherein the correspondence information comprises evaluation information for evaluating the video stream.

16. Device according to claim 15, wherein the evaluation information indicates an algorithm to be used for evaluating.

17. Device according to claim 15, wherein the evaluation information comprises a pointer to an algorithm to be used for deriving the mapping out of a set of algorithms.

18. Device according to claim 17, wherein the evaluation information also comprises an indication of a pose of the at least one object at which the algorithm is to be applied for the derivation of the mapping.

19. Device according to claim 1, wherein the first mesh data and/or the second mesh data, comprises two or more meshes, each comprising a plurality of vertices, wherein one of the two or more meshes is an extension of another one of the two or more meshes.

20. Device according to claim 1, wherein the device further retrieves from the data stream a plurality of further mesh data relating to meshes, and the correspondence information comprises association information, identifying the first and second mesh out of the plurality of meshes.

21. Device according to claim 1, wherein the first mesh is an update of a previously transmitted first mesh and/or the second mesh is an update of the previously transmitted second mesh.

22. Device according to claim 1, wherein the correspondence information is an update of a previously transmitted correspondence information.

23. Device according to claim 22, wherein the update correspondence information comprises one or more of length of correspondences values, which are configurable, number of correspondences, type of correspondences, for example face-to-face, vertex-to-face, and/or vertex-to-vertices, and/or information comprising the length of the values of those correspondences.

24. Device according to claim 23, wherein linked actual data is accessible on a network location.

25. Device according to claim 1, wherein any of the data and/or information can be provided as a link in the data stream, linking to the actual data/or information.

26. Device according to claim 25, wherein the data and/or information provided as a link in the data stream refers to one or more of the scene description language, the scene, the object, the first mesh data, the first mesh, the second mesh data, the second mesh, one of a plurality of vertices, one of vertices, a mapping, a transformation information, a transformation, an application information, pose data, a pose, skeleton data, joint data, weight data, a texture information, a texture, an evaluation information, an algorithm, and/or an association information.

27. Device according to claim 1, wherein the scene description language is based on the JSON standard.

28. Device according to claim 27, wherein the scene description language is in Graphics Library Transmission Format.

29. Device according to claim 1, wherein the second mesh data is a volumetric scan.

30. Device according to claim 1, wherein the second mesh data is recorded with one more camera in three-dimensional technology, or computer-generated.

31. Method of evaluating a data stream comprising:
evaluating one or more objects of volumetric video data from a data stream into which the one or more objects are encoded in a scene description language, the data stream representing a scene comprising one or more objects; and
retrieving from the data stream for at least one object at least first mesh data, second mesh data and correspondence information, wherein
the first mesh data describes the at least one object with a first mesh;
the second mesh data describes the at least one object with a second mesh; and
wherein the correspondence information indicates a mapping between the first and second mesh.

32. A non-transitory digital storage medium having a computer program stored thereon to perform the method of evaluating a data stream, the method comprising:
evaluating one or more objects of volumetric video data from a data stream into which the one or more objects are encoded in a scene description language, the data stream representing a scene comprising one or more objects; and
retrieving from the data stream for at least one object at least first mesh data, second mesh data and correspondence information, wherein
the first mesh data describes the at least one object with a first mesh;
the second mesh data describes the at least one object with a second mesh; and
wherein the correspondence information indicates a mapping between the first and second mesh,
when said computer program is run by a computer.

* * * * *